(12) United States Patent
Matsuoka

(10) Patent No.: US 11,884,099 B2
(45) Date of Patent: Jan. 30, 2024

(54) VARIABLE SHAPE STRUCTURE HAVING BEND MEMBERS

(71) Applicant: FUJIMIYASEISAKUSHO CO., LTD., Arao (JP)

(72) Inventor: Norimichi Matsuoka, Arao (JP)

(73) Assignee: FUJIMIYASEISAKUSHO CO., LTD., Arao (JP)

( * ) Notice: Subject to any disclaimer, the term of this patent is extended or adjusted under 35 U.S.C. 154(b) by 472 days.

(21) Appl. No.: 17/132,122

(22) Filed: Dec. 23, 2020

(65) Prior Publication Data

US 2021/0354503 A1 Nov. 18, 2021

(30) Foreign Application Priority Data

May 15, 2020 (JP) ................................ 2020-085795

(51) Int. Cl.
*A47F 5/10* (2006.01)
*A47B 43/00* (2006.01)
(Continued)

(52) U.S. Cl.
CPC ............... *B44F 99/00* (2013.01); *A47F 5/10* (2013.01); *A47B 43/00* (2013.01); *A47F 7/00* (2013.01);
(Continued)

(58) Field of Classification Search
CPC ......... E04B 1/344; A63H 33/00; A63H 13/00; B44F 99/00; A47F 5/10; A47F 7/00;
(Continued)

(56) References Cited

U.S. PATENT DOCUMENTS 43,113 A * 6/1864 Harold ............... G06Q 30/0601
   211/202
173,979 A * 2/1876 Maher ................... E06B 9/0661
   160/161
(Continued)

FOREIGN PATENT DOCUMENTS

CN 102644352 A 8/2012
EP 0455850 A1 11/1991
(Continued)

OTHER PUBLICATIONS

EPO Extended Search Report for corresponding EP Application No. 20216230.1; dated Jun. 8, 2021.

*Primary Examiner* — Jennifer E. Novosad
(74) *Attorney, Agent, or Firm* — CANTOR COLBURN LLP

(57) ABSTRACT

Bend members making up a variable shape structure each have a central coupling point, a one-end coupling point, and an other-end coupling point that are arranged so as to form a V shape with a fixed bend angle. A central coupling point of the first bend member and a central coupling point of the second bend member are pivotally coupled together. A central coupling point of the third bend member and a central coupling point of the fourth bend member are pivotally coupled together. A one-end coupling point of the first bend member and a one-end coupling point of the third bend member are pivotally coupled together. A one-end coupling point of the second bend member and a one-end coupling point of the fourth bend member are pivotally coupled together. The first, the second, the third, and the fourth bend members are of the same shape and the same size.

14 Claims, 27 Drawing Sheets

(51) Int. Cl.
*B44F 99/00* (2013.01)
*A47F 7/02* (2006.01)
*F16M 13/02* (2006.01)
*A63H 13/00* (2006.01)
*A47F 7/00* (2006.01)
*F16S 5/00* (2006.01)

(52) U.S. Cl.
CPC ............... *A47F 7/02* (2013.01); *A63H 13/00* (2013.01); *F16M 13/022* (2013.01); *F16S 5/00* (2013.01)

(58) Field of Classification Search
CPC ........... A47F 7/02; A47B 43/00; A47B 61/02; F16M 13/022; F16S 55/00
USPC ...... 211/195, 105, 104, 202, 182; 248/277.1
See application file for complete search history.

(56) References Cited

U.S. PATENT DOCUMENTS

| | | | | | |
|---|---|---|---|---|---|
| 186,825 | A | * | 1/1877 | Gehr | A47G 25/746 211/105 |
| 245,897 | A | * | 8/1881 | Watters | A47G 25/746 211/105 |
| 250,205 | A | * | 11/1881 | Collins | B65D 7/26 52/109 |
| 264,000 | A | * | 9/1882 | Vanderlip | D06F 57/10 5/98.1 |
| 366,739 | A | * | 7/1887 | Ryan | B65D 85/305 211/105 |
| 526,450 | A | * | 9/1894 | Leach | A47G 25/746 211/105 |
| 716,614 | A | * | 12/1902 | Bagge | A47B 96/061 211/105 |
| 786,201 | A | * | 3/1905 | Frankenthal | D06F 57/10 211/202 |
| 1,109,275 | A | * | 9/1914 | Andrews | A47G 25/746 211/202 |
| 1,175,847 | A | * | 3/1916 | Vokel | A61C 1/02 433/108 |
| 1,909,503 | A | * | 5/1933 | Randall | A47F 5/13 211/202 |
| 1,952,494 | A | * | 3/1934 | Gafford | A47G 19/08 248/172 |
| 2,013,882 | A | * | 9/1935 | Francis | A47B 23/007 248/229.24 |
| 2,697,845 | A | * | 12/1954 | Broner | E01D 15/124 52/109 |
| 3,168,791 | A | * | 2/1965 | Nutting | A47C 3/265 248/188.7 |
| 3,888,056 | A | * | 6/1975 | Kelly | E04H 15/50 52/109 |
| 4,287,993 | A | * | 9/1981 | Licari | A47G 25/0607 211/105 |
| RE31,565 | E | * | 4/1984 | Beaulieu | E04B 1/3441 211/202 |
| 4,580,376 | A | * | 4/1986 | Vinum | E04H 17/16 52/645 |
| 4,658,560 | A | * | 4/1987 | Beaulieu | E04B 1/3441 52/109 |
| 5,038,532 | A | * | 8/1991 | Shahinpoor | E04B 1/3441 52/109 |
| 5,761,871 | A | * | 6/1998 | Atake | E04B 1/3441 52/645 |
| 6,061,923 | A | * | 5/2000 | Case | A45D 20/12 34/90 |
| 6,834,465 | B2 | * | 12/2004 | Hoberman | E04H 15/50 52/3 |
| 6,918,312 | B2 | * | 7/2005 | Elwood | G01K 15/00 73/866.5 |
| D555,202 | S | * | 11/2007 | Siegel | D19/90 |
| 8,291,781 | B2 | * | 10/2012 | Guerrero | E21B 43/105 74/25 |
| 9,153,860 | B2 | * | 10/2015 | Tserodze | E04B 1/344 |
| 9,316,350 | B2 | * | 4/2016 | Matsuoka | F16M 13/022 |
| 9,334,643 | B2 | * | 5/2016 | Betts | E04B 1/32 |
| 9,840,837 | B1 | * | 12/2017 | Matsuoka | E04H 15/50 |
| 10,006,194 | B2 | * | 6/2018 | Matsuoka | E04B 1/32 |
| 10,006,195 | B2 | * | 6/2018 | Matsuoka | F16M 11/38 |
| 10,228,100 | B2 | * | 3/2019 | Magielse | F21V 23/06 |
| 10,267,031 | B2 | * | 4/2019 | Matsuoka | E04H 15/50 |
| 10,738,458 | B2 | * | 8/2020 | Matsuoka | A63H 33/00 |
| 10,844,593 | B1 | * | 11/2020 | Matsuoka | E04H 15/50 |
| 11,542,133 | B2 | * | 1/2023 | Matsuoka | B66F 3/22 |
| 2003/0080073 | A1 | * | 5/2003 | Huang | A47B 43/00 211/74 |
| 2007/0095375 | A1 | * | 5/2007 | Sample | E04H 1/1277 52/646 |
| 2009/0158674 | A1 | * | 6/2009 | Guerrero | E21B 43/105 74/89 |
| 2015/0300560 | A1 | * | 10/2015 | Matsuoka | A47B 23/025 5/503.1 |
| 2016/0319985 | A1 | | 11/2016 | Matsuoka | |
| 2021/0354503 | A1 | * | 11/2021 | Matsuoka | A47F 5/10 |

FOREIGN PATENT DOCUMENTS

| | | | |
|---|---|---|---|
| EP | 3287177 A1 | 2/2018 | |
| EP | 3909658 A1 * | 11/2021 | ............ B44F 99/00 |
| JP | 2016211617 A | 12/2016 | |

\* cited by examiner

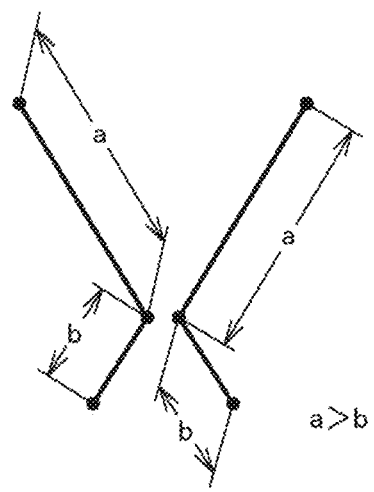
Fig.12
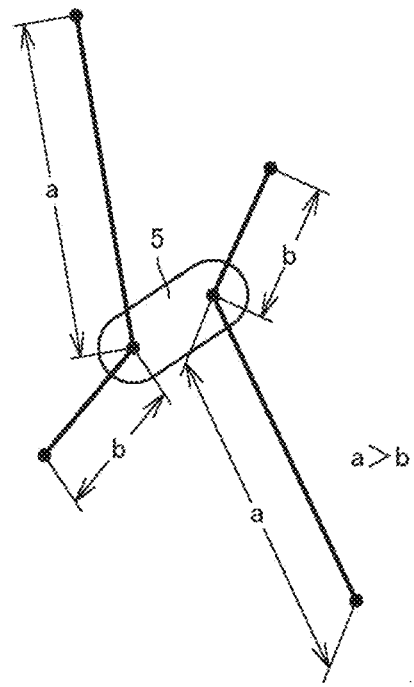
Fig.13
Fig.14
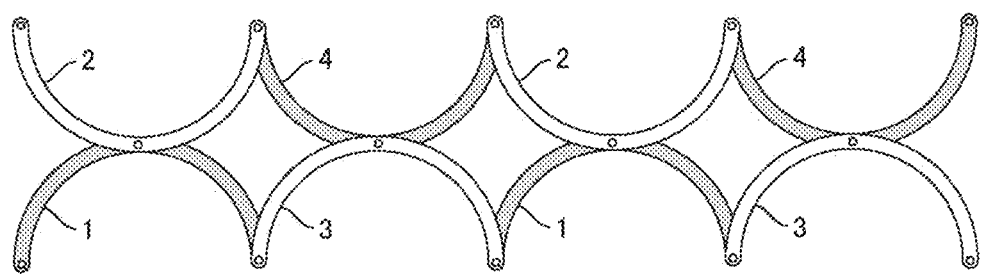

⇩

VARIABLE SHAPE STRUCTURE HAVING BEND MEMBERS

CROSS REFERENCE TO RELATED APPLICATIONS

The present invention claims priority under 35 U.S.C. § 119 to Japanese Application No. 2020-085795 filed May 15, 2020, the entire content of which is incorporated herein by reference.

BACKGROUND OF THE INVENTION

1. Field of the Invention

The present invention relates to a variable shape structure having a plurality of bend members, capable of stimulating a person's visual interest by changes in geometry or shape, and to a mechanically useful structure.

2. Background Art

In Japanese Laid-Open Patent Publication No. 2016-211617, the same applicant as this application proposed a variable area frame and a variable volume three-dimensional structure, capable of changing the area of a planar shape and the volume of a three-dimensional shape in response to expansion/contraction movement of extendable arms using cross links.

The inventor of the present application thought that, instead of merely changing the area of a frame and the volume of a three-dimensional structure, changing to a completely different shape unpredictable from the original shape might be more visually intriguing and improve the mechanical convenience.

SUMMARY OF INVENTION

An object of the present invention is to provide a variable shape structure as a visual interest stimulating structure capable of changing from its original shape to a completely different shape.

An embodiment of such a variable shape structure is a variable shape panel. Another embodiment of such a variable shape structure is an extendable arm structure. Yet another embodiment of such a variable shape structure is a variable shape frame.

A variable shape structure according to an embodiment of the present invention includes a first bend member, a second bend member, and a third bend member.

The first bend member has a first central coupling point, a first one-end coupling point, and a first other-end coupling point that are arranged so as to form a V shape with a fixed bend angle. The second bend member has a second central coupling point, a second one-end coupling point, and a second other-end coupling point that are arranged so as to form a V shape with a fixed bend angle, the second central coupling point being pivotally coupled to the first central coupling point of the first bend member. The third bend member has a third central coupling point, a third one-end coupling point, and a third other-end coupling point that are arranged so as to form a V shape with a fixed bend angle, at least one of the third one-end coupling point and the third other-end coupling point being coupled to one of the first one-end coupling point and the first other-end coupling point of the first bend member.

The variable shape panel as a typical example of the variable shape structure according to an embodiment of the present invention is formed on the same virtual surface by coupling together a plurality of members that are adjacent in an X direction and a Y direction, the panel including the first bend member, the second bend member, the third bend member, and a fourth bend member.

The first bend member has the first central coupling point, the first one-end coupling point, and the first other-end coupling point that are arranged so as to form a V shape with a fixed bend angle. The second bend member has the second central coupling point, the second one-end coupling point, and the second other-end coupling point that are arranged so as to form a V shape with a fixed bend angle, the second bend member being adjacent to the first bend member in a Y direction. The second central coupling point is pivotally coupled to the first central coupling point of the first bend member.

The third bend member has the third central coupling point, the third one-end coupling point, and the third other-end coupling point that are arranged so as to form a V shape with a fixed bend angle, the third bend member being adjacent to the first bend member in an X direction. At least one of the third one-end coupling point and the third other-end coupling point is coupled to one of the first one-end coupling point and the first other-end coupling point of the first bend member. The fourth bend member has a fourth central coupling point, a fourth one-end coupling point, and a fourth other-end coupling point that are arranged so as to form a V shape with a fixed bend angle, the fourth bend member being adjacent to the first bend member in the Y direction. At least one of the fourth one-end coupling point and the fourth other-end coupling point is coupled to one of the first one-end coupling point and the first other-end coupling point of the first bend member.

Preferably, as one example, the bend members contiguously coupled in the X direction or the Y direction each have the same shape and the same size, with a length between the central coupling point and the one-end coupling point being equal to a length between the central coupling point and the other-end coupling point.

More preferably, as one example, the bend members contiguously coupled in the X direction and the bend members contiguously coupled in the Y direction each have the same shape and the same size, with a length between the central coupling point and the one-end coupling point being equal to a length between the central coupling point and the other-end coupling point.

In an embodiment, the third one-end coupling point of the third bend member is pivotally coupled to the first one-end coupling point of the first bend member, while the fourth one-end coupling point of the fourth bend member is pivotally coupled to the first one-end coupling point of the first bend member.

In another embodiment, the variable shape panel further includes a cross unit in which two linear members crossed in an X shape are pivotally coupled together at an intersection. The cross unit has four end coupling points, each of the four end coupling points being pivotally coupled to the one-end coupling point of one of the first to the fourth bend members.

The variable shape panel according to another embodiment is formed by coupling together a plurality of extendable arms that are adjacent in the X direction and the Y direction. This variable shape panel includes the first bend member, the second bend member, the third bend member, and the fourth bend member.

The first bend member has the first central coupling point, the first one-end coupling point, and the first other-end coupling point that are arranged so as to form a V shape with a fixed bend angle. The second bend member has the second central coupling point, the second one-end coupling point, and the second other-end coupling point that are arranged so as to form a V shape with a fixed bend angle, the second bend member being adjacent to the first bend member in the Y direction, the second central coupling point being pivotally coupled to the first central coupling point of the first bend member. The third bend member has the third central coupling point, the third one-end coupling point, and the third other-end coupling point that are arranged so as to form a V shape with a fixed bend angle, the third bend member being adjacent to the first bend member in the X direction, the third one-end coupling point being pivotally coupled to the first one-end coupling point of the first bend member. The fourth bend member has the fourth central coupling point, the fourth one-end coupling point, and the fourth other-end coupling point that are arranged so as to form a V shape with a fixed bend angle, the fourth bend member being adjacent to the second bend member in the X direction, the fourth one-end coupling point being pivotally coupled to the second one-end coupling point of the second bend member, the fourth central coupling point being pivotally coupled to the third central coupling point of the third bend member.

At least one of the bend members include linearly contiguous cross units to make up an extendable arm. Each cross unit includes a first linear member, a second linear member crossing the first linear member, and a pivot shaft via which the first linear member and the second linear member are pivotally coupled together at an intersection.

In the above embodiment, each of the bend members forms e.g. a semicircular arm in its expanded state.

The extendable arm as another embodiment of the variable shape structure according to an embodiment of the present invention includes a plurality of cross units each having a first arm and a second arm that are crossed in an X shape, at an intersection of which both the arms are pivotally coupled, the cross units adjacent to each other being pivotally coupled together at their ends.

The first arm and the second arm each include the first bend member, the second bend member, the third bend member, and the fourth bend member.

The first bend member has the first central coupling point, the first one-end coupling point, and the first other-end coupling point that are arranged so as to form a V shape with a fixed bend angle. The second bend member has the second central coupling point, the second one-end coupling point, and the second other-end coupling point that are arranged so as to form a V shape with a fixed bend angle, the second central coupling point being pivotally coupled to the first central coupling point of the first bend member. The third bend member has the third central coupling point, the third one-end coupling point, and the third other-end coupling point that are arranged so as to form a V shape with a fixed bend angle, the third one-end coupling point being pivotally coupled to the first one-end coupling point of the first bend member. The fourth bend member has the fourth central coupling point, the fourth one-end coupling point, and the fourth other-end coupling point that are arranged so as to form a V shape with a fixed bend angle, the fourth one-end coupling point being pivotally coupled to the second one-end coupling point of the second bend member, the fourth central coupling point being pivotally coupled to the third central coupling point of the third bend member.

The variable shape frame as yet another of the variable shape structure according to an embodiment of the present invention is formed by coupling a plurality of adjacent members together and includes at least the first bend member, the second bend member, and the third bend member.

The first bend member has the first central coupling point, the first one-end coupling point, and the first other-end coupling point that are arranged so as to form a V shape with a fixed bend angle. The second bend member has the second central coupling point, the second one-end coupling point, and the second other-end coupling point that are arranged so as to form a V shape with a fixed bend angle, the second central coupling point being pivotally coupled to the first central coupling point of the first bend member. The third bend member has the third central coupling point, the third one-end coupling point, and the third other-end coupling point that are arranged so as to form a V shape with a fixed bend angle, at least one of the third one-end coupling point and the third other-end coupling point being coupled to the first one-end coupling point or the first other-end coupling point of the first bend member.

Preferably, as one example, the first bend member, the second bend member, and the third member have the same shape and the same size, with a length between the central coupling point and the one-end coupling point being equal to a length between the central coupling point and the other-end coupling point.

In an embodiment, the variable shape frame further includes the fourth bend member. The fourth bend member has the fourth central coupling point, the fourth one-end coupling point, and the fourth other-end coupling point that are arranged so as to form a V shape with a fixed bend angle, the fourth central coupling point being pivotally coupled to the third central coupling point of the third bend member. The third one-end coupling point of the third bend member is pivotally coupled to the first one-end coupling point of the first bend member. The fourth one-end coupling point of the fourth bend member is pivotally coupled to the second one-end coupling point of the second bend member.

Preferably, as one example, the fourth bend member has the same shape and the same size as those of the first bend member, the second bend member, and the third bend member.

In another embodiment, the third one-end coupling point of the third bend member is coupled to the first one-end coupling point of the first bend member, while the third other-end coupling point of the third bend member is coupled to the first other-end coupling point of the first bend member.

In an embodiment, in each of the bend members, the length between the central coupling point and the one-end coupling point is equal to the length between the central coupling point and the other-end coupling point. In another embodiment, in each of the bend members, the length between the central coupling point and the one-end coupling point is different from the length between the central coupling point and the other-end coupling point.

In an embodiment, the variable shape frame is a frame having a plurality of corners. This variable shape frame further includes a first bent member, a second bent member, and a corner coupling shaft. The first bent member has a bent shape whose one end at each of the corners is pivotally coupled to the one-end coupling point of one of the bend members adjacent on one hand and whose other end at each of the corners is pivotally coupled to the other-end coupling point of one of the bend members adjacent on the other. The second bent member has a bent shape whose one end at each of the corners is pivotally coupled to the one-end coupling point of one of the bend members adjacent on one hand, to which the first bent member is not coupled and whose other end at each of the corners is pivotally coupled to the other-end coupling point of one of the bend members adjacent on the other, to which the first bent member is not coupled. The corner coupling shaft pivotally couples the first bent member and the second bent member together at their intersection.

According to the variable shape structure having the above configuration, the shape before and after the movement become unpredictably different, arousing visual interest more greatly.

BRIEF DESCRIPTION OF DRAWINGS

FIG. 12 is a view showing another dimensional relationship of the bend member.

FIG. 13 is a view showing yet another dimensional relationship of the bend member.

FIG. 14 is a front view of another example of the structure coupling the first bend member, the second bend member, the third bend member, and the fourth bend member in the X direction.

DESCRIPTION OF EMBODIMENTS

Figure 1:
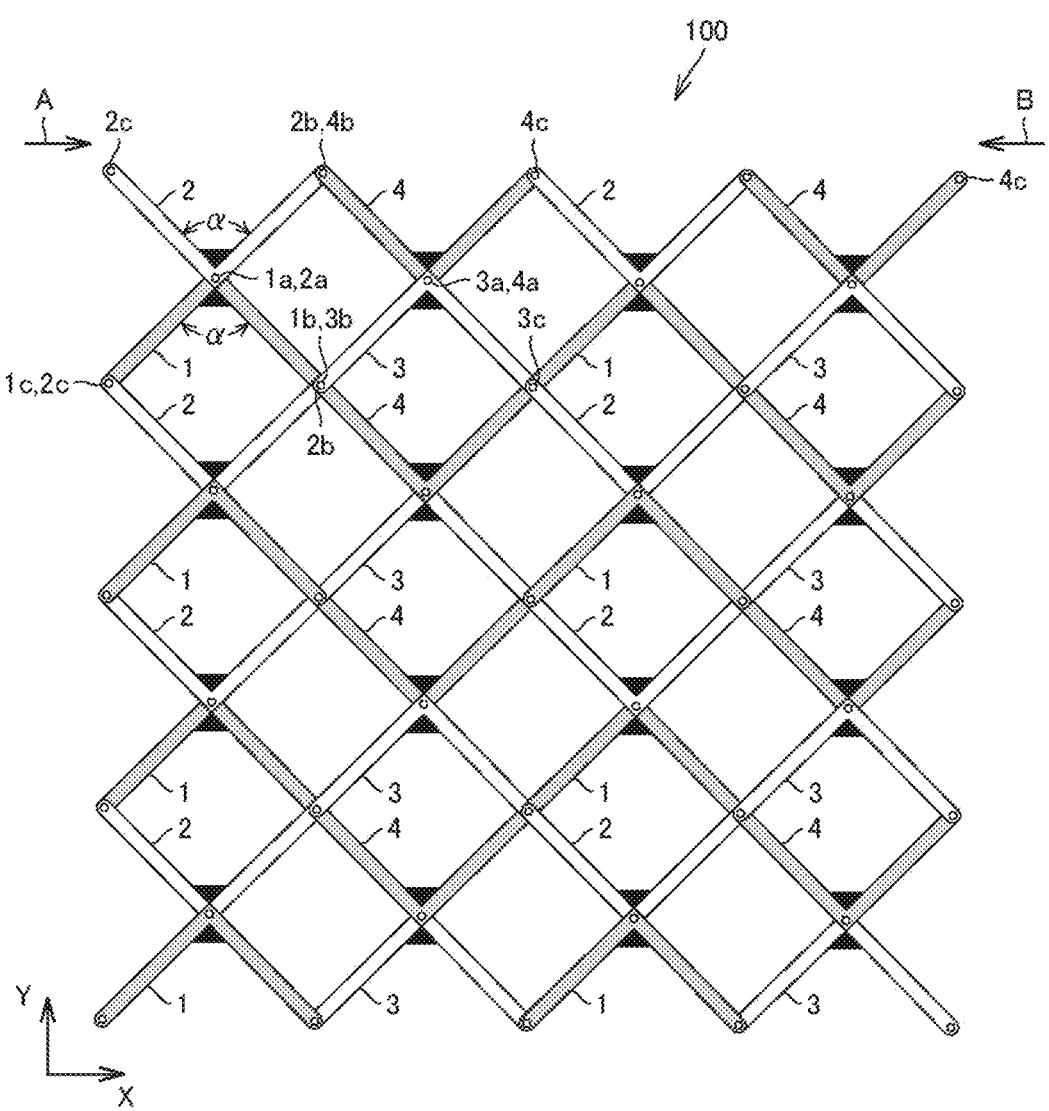
FIG. 1 is a front view of a variable shape panel according to an embodiment of the present invention.
Figure 2:
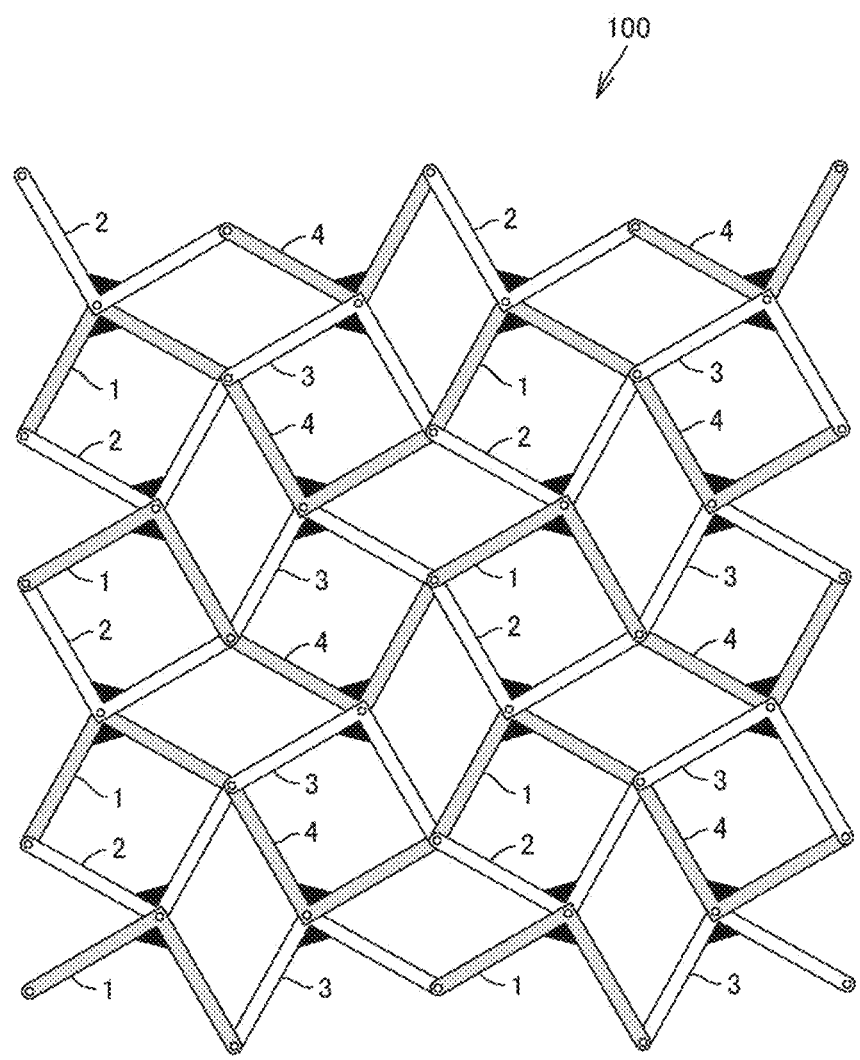
FIG. 2 is a front view of the variable shape panel having a shape changed from the state shown in FIG. 1.

<Embodiments Shown in FIG. 1 to FIG. 4>

FIG. 1 to FIG. 4 show a first embodiment of a variable shape panel in accordance with the present invention. A variable shape panel 100 shown is a panel formed by coupling together a plurality of members adjacent in an X direction and a Y direction. Although the "X direction" and the "Y direction" typically mean an X-axis direction and a Y-axis direction, respectively, on XY coordinate axes, it is to be understood that the case of not being orthogonal is also included without being limited to the case where both directions are orthogonal to each other. On the page of FIG.

1, a left-to-right direction is the "X direction" and a vertical direction is the "Y direction".

The variable shape panel 100 includes a first bend member 1, a second bend member 2, a third bend member 3, and a fourth bend member 4. In FIG. 1 to FIG. 4, the first bend member 1 and the fourth bend member 4 are depicted in gray to definitely identify two adjacent bend members. Black triangles are imparted to corner portions each having a fixed angle α, to definitely indicate that those portions have no change in angle.

The first bend member 1 is of a bent shape and has a first central coupling point 1*a*, a first one-end coupling point 1*b*, and a first other-end coupling point 1*c*, arranged so as to form a V shape with the fixed bend angle α. The fixed bend angle α is formed by a line joining the first one-end coupling point 1*b*, the first central coupling point 1*a*, and the first other-end coupling point 1*c*, not by the shape of the first bend member 1. This applies to the second bend member 2, the third bend member 3, and the fourth bend member 4.

The second bend member 2 lies adjacent to the first bend member 1 in the Y direction. This second bend member 2 has a second central coupling point 2*a*, a second one-end coupling point 2*b*, and a second other-end coupling point 2*c*, arranged so as to form a V shape with the fixed bend angle α. The second central coupling point 2*a* of the second bend member 2 is pivotally coupled to the first central coupling point 1*a* of the first bend member 1.

The third bend member 3 lies adjacent to the first bend member 1 in the X direction. This third bend member 3 has a third central coupling point 3*a*, a third one-end coupling point 3*b*, and a third other-end coupling point 3*c*, arranged so as to form a V shape with the fixed bend angle α. At least one of the third one-end coupling point 3*b* and the third other-end coupling point 3*c* of the third bend member 3 is coupled to the first one-end coupling point 1*b* or the first other-end coupling point 1*c* of the first bend member 1. In the shown embodiment, the third one-end coupling point 3*b* of the third bend member 3 is pivotally coupled to the first one-end coupling point 1*b* of the first bend member 1.

In the embodiment of FIG. 1, the second bend member 2 lies adjacent vertically to the first bend member 1 in the Y direction. In case of forming a panel by coupling four bend members adjacent in the X direction and the Y direction, the second bend member is adjacent above to the first bend member 1 in the Y direction, while the fourth bend member is adjacent below to the first bend member 1 in the Y direction.

In the embodiment of FIG. 1, the second bend member 2 lying below the first bend member 1 in the Y direction serves as the "fourth bend member". To eliminate the confusion, for convenience, the second bend member functioning as the "fourth bend member" is referred to as "fourth bend member (2)".

The fourth bend member (2) lies adjacent to the first bend member 1 in the Y direction. This fourth bend member (2) has a fourth central coupling point (2*a*), a fourth one-end coupling point (2*b*), and a fourth other-end coupling point (2*c*), arranged so as to form a V shape with the fixed bend angle α. At least one of the fourth one-end coupling point (2*b*) and the fourth other-end coupling point (2*c*) of the fourth bend member (2) is coupled to the first one-end coupling point 1*b* or the first other-end coupling point 1*c* of the first bend member 1. In the shown embodiment, the fourth one-end coupling point (2*b*) of the fourth bend member (2) is coupled to the first one-end coupling point 1*b* of the first bend member 1, while the fourth other-end coupling point (2*c*) is coupled to the first other-end coupling point 1*c* of the first bend member 1. In this embodiment, the first bend member 1 and the fourth bend member (2) form an undeformable quadrangle.

Figure 4:
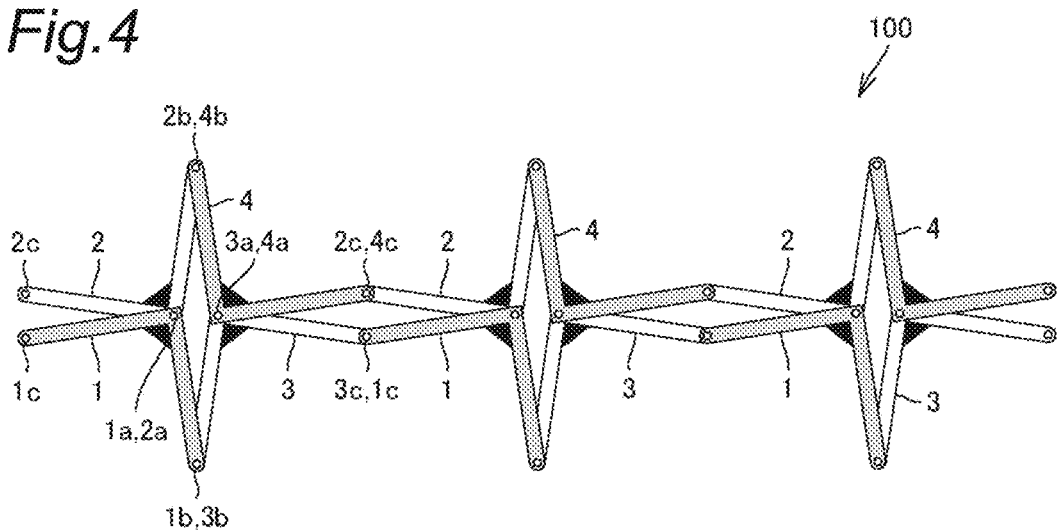
FIG. 4 is a front view of a structure coupling a first bend member, a second bend member, a third bend member, and a fourth bend member in an X direction.
Figure 5:
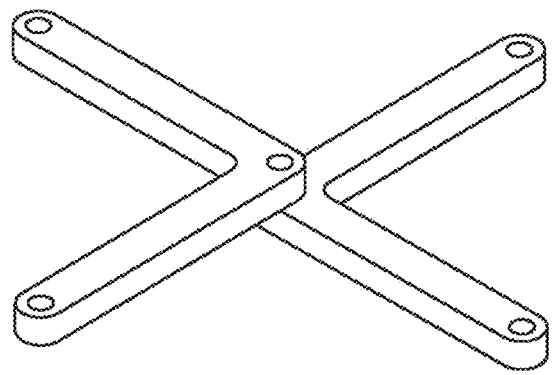
FIG. 5 is a view showing an example of a structure coupling two bend members together.
Figure 6:
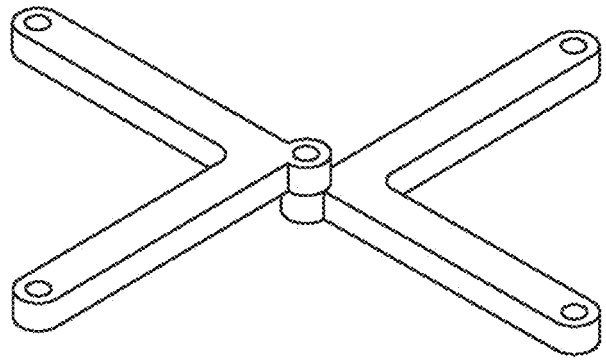
FIG. 6 is a view showing another example of the structure coupling two bend members together.
Figure 7:
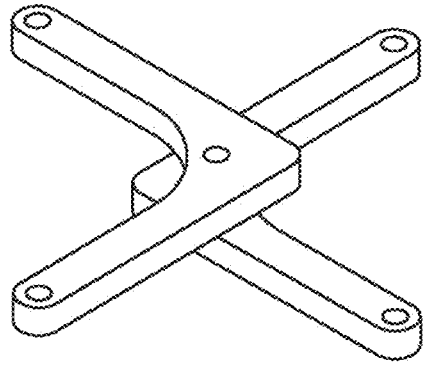
FIG. 7 is a view showing still another example of the structure coupling two bend members together.
Figure 8:
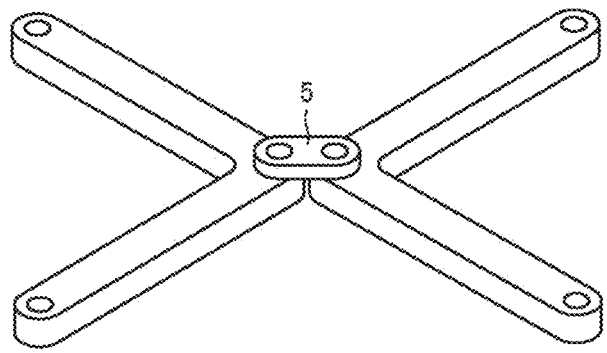
FIG. 8 is a view showing yet another example of the structure coupling two bend members together.

A variable shape frame can be formed by using a partial structure, e.g. a series structure extending in the X direction, of the variable shape panel 100 shown in FIG. 1. The variable shape frame forms a looped shape and forms, e.g. a polygonal or circular frame. FIG. 4 shows the series structure forming part of the variable shape frame.

As shown in FIG. 4, the series structure forming part of the variable shape frame include the first bend member 1, the second bend member 2, the third bend member 3, and the fourth bend member 4. Since the first bend member 1, the second bend member 2, and the third bend member 3 have already been mentioned, they will not again be described here. The fourth bend member 4 has a fourth central coupling point 4*a*, a fourth one-end coupling point 4*b*, and a fourth other-end coupling point 4*c*, arranged so as to form a V shape with the fixed bend angle α. The fourth central coupling point 4*a* of the fourth bend member 4 is pivotally coupled to the third central coupling point 3*a* of the third bend member 3. The fourth one-end coupling point 4*b* of the fourth bend member 4 is pivotally coupled to the second one-end coupling point 2*b* of the second bend member 2.

The variable shape frame according to another embodiment may use a series structure extending in the Y direction of the variable shape panel 100 shown in FIG. 1. In this case, for example, a leftmost vertical structure of the variable shape panel 100 of FIG. 1 is used as part of the variable shape frame. In this embodiment, the fourth bend member (2) making up the variable shape panel 100 acts as the third bend member of the variable shape frame. The third one-end coupling point (2*b*) of this third bend member (2) is coupled to the first one-end coupling point 1*b* of the first bend member 1, while the third other-end coupling point (2*c*) is coupled to the first other-end coupling point 1*c* of the first bend member 1.

Figure 3:
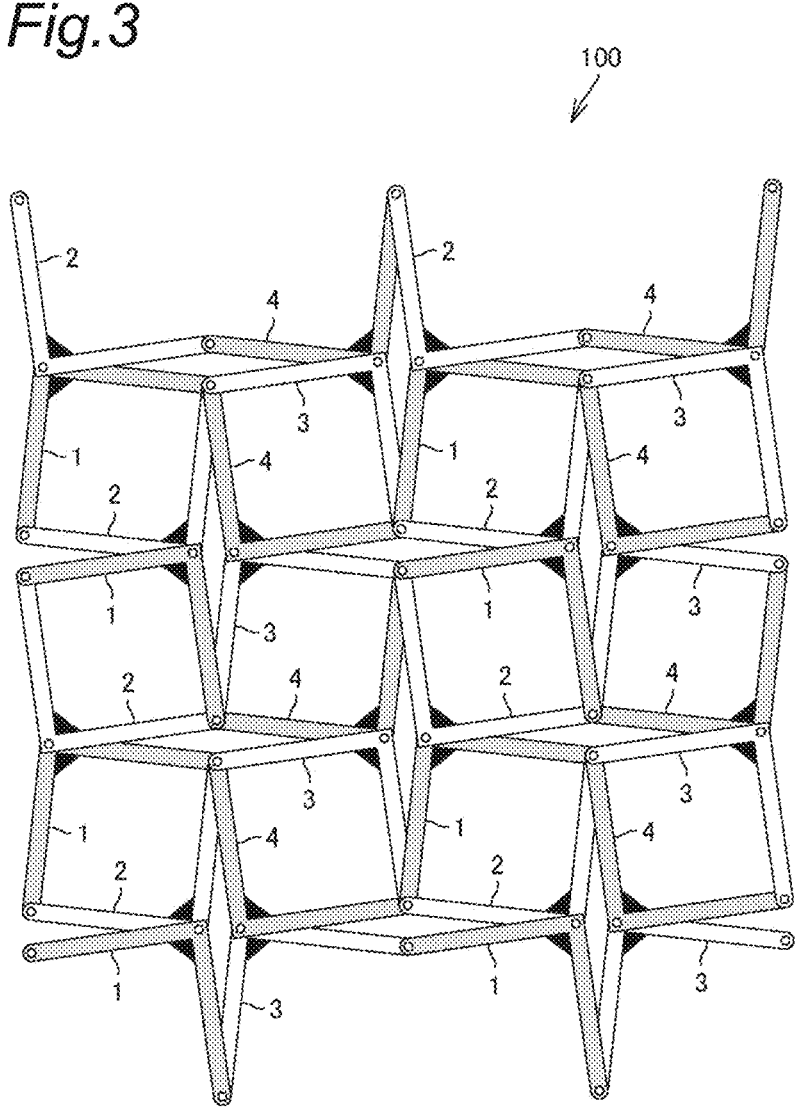
FIG. 3 is a front view of the variable panel having a shape further changed from the state shown in FIG. 2.

FIG. 1 shows an original shape of the variable shape panel 100. From this state, it changes to a shape shown in FIG. 2 when moving the second other-end coupling point 2*c* of the leftmost and uppermost second bend member 2 of the bend members making up the variable shape panel 100 rightward (in a direction indicated by an arrow A in FIG. 1) and further moving the fourth other-end coupling point 4*c* of the rightmost and uppermost fourth bend member 4 leftward (in a direction indicated by an arrow B in FIG. 1). When further moving them in the same respective directions, it changes to a shape shown in FIG. 3. The change from the original shape of FIG. 1 to the shape of FIG. 3 is extremely difficult to predict. This unpredictable change in panel shape greatly arouses a person's visual interest.

Figure 15:
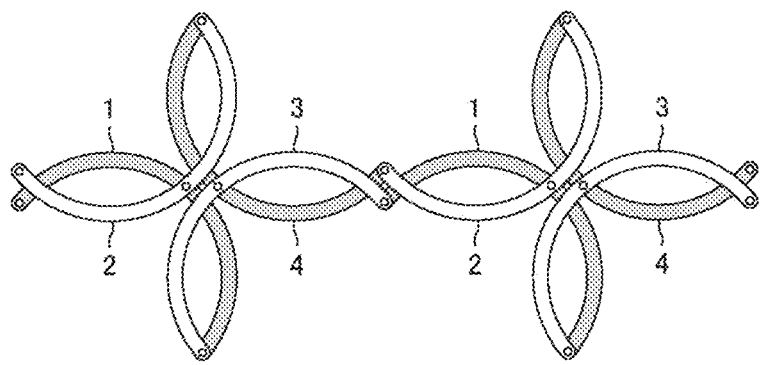
FIG. 15 is a front view showing a shape changed from the state shown in FIG. 14.
Figure 16:
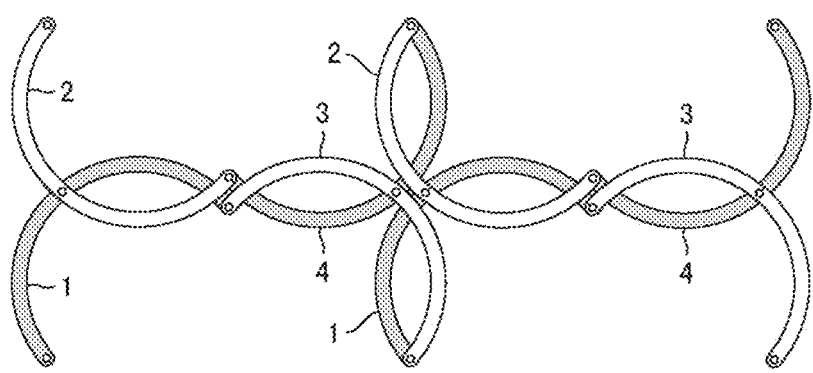
FIG. 16 is a front view showing a shape further changed from the state shown in FIG. 15.

In case of changing the shape of the variable shape panel 100, it changes to a shape different from FIG. 3 when moving the second other-end coupling point 2*c* of the leftmost and uppermost second bend member 2 leftward (in a direction opposite to the direction indicated by the arrow A in FIG. 1) and further moving the fourth other-end coupling point 4*c* of the rightmost and uppermost fourth bend member 4 rightward (in a direction opposite to the direction indicated by the arrow B in FIG. 1). An example of such a motion is shown in FIG. 14 to FIG. 16 that will be described later.

<Coupled Structure of Adjacent Bend Members>

FIG. 5 to FIG. 8 show some examples of a structure coupling two adjacent bend members. In a structure shown in FIG. 5, the V-shaped bend members are overlaid on each other at their base end bends so that these overlaid portions are pivotally coupled together via a shaft. In a structure shown in FIG. 6, the V-shaped bend members have at their base end portions cylindrical mounting parts which are overlaid on each other so that these overlaid portions are pivotally coupled together via the shaft. In a structure shown in FIG. 7, the V-shaped bend members are overlaid on each other up to a position where the base end portion of the V-shaped bend member on one hand extends greatly beyond the base end portion of the V-shaped bend member on the other so that these overlaid portions are pivotally coupled together via the shaft. In a structure shown in FIG. 8, a coupling member 5 is disposed that couples together the base end portion of the V-shaped bend member on one hand and the base end portion of the V-shaped bend member on the other, by which the respective bend members are pivotally coupled via shafts to the coupling member 5.

The coupled structures shown in FIG. 5 to FIG. 8 are applicable also to the case of coupling end portions of adjacent bend members to each other.

<Shape of Bend Member>

Figure 9:
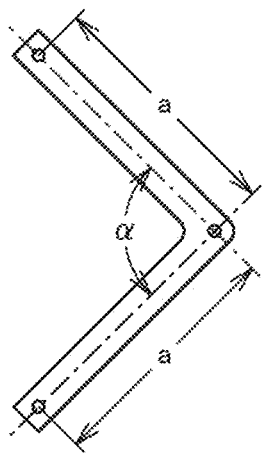
FIG. 9 is a view showing a dimensional relationship of the bend member.

FIG. 9 shows an example of the bend member. The shown bend member has a V-shaped bent shape in its contour. The thing that "forms a V-shape with a fixed bend angle" defined in claims of this application is not the external shape of the bend member, but a line joining the one-end coupling point, the central coupling point, and the other-end coupling point. In the bend member shown in FIG. 9, a length "a" of a line joining the central coupling point and the one-end coupling point is the same as the length "a" of a line joining the central coupling point and the other-end coupling point. An included angle "a" between the line joining the central coupling point and the one-end coupling point and the line joining the central coupling point and the other-end coupling point is a fixed angle. In the series structure making up part of the variable shape panel shown in FIG. 1 and of the variable shape frame shown in FIG. 4, the first bend member, the second bend member, the third bend member, and the fourth bend member are of the same shape and of the same size.

Figure 10:
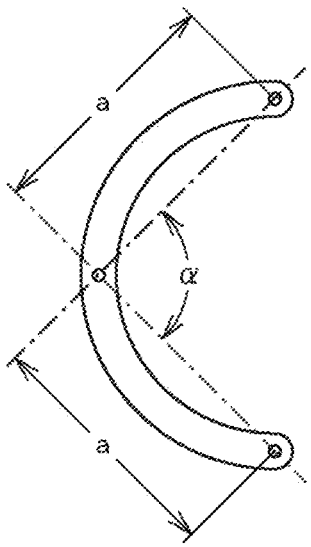
FIG. 10 is a view showing another example of the bend member.

FIG. 10 shows another example of the bend member. The first, second, third, and fourth bend members may be formed from an arc-shaped member as shown in FIG. 10. In the case of the arc-shaped member as well, the line joining the central coupling point and the one-end coupling point and the line joining the central coupling point and the other-end coupling point form a V shape with a fixed bend angle. In this case, preferably, as one example, the length "a" between the central coupling point and the one-end coupling point is equal to the length "a" between the central coupling point and the other-end coupling point and, furthermore, the first, second, third, and fourth bend members are of the same shape and of the same size.

Although that the first, second, third, and fourth bend members have "the same shape and the same size" means typically that the external shape of each bend member is of the same shape and the same size, it is to be construed in this specification that each bend member is of "the same shape and the same size" as long as the "V shape" formed by the one-end coupling point, the central coupling point, and the other-end coupling point is the same in shape and size even though the external shape of each bend member is different.

Figure 11:
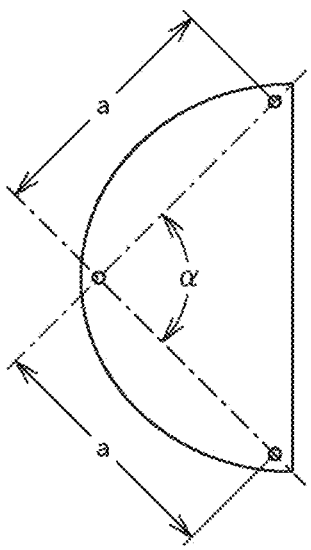
FIG. 11 is a view showing still another example of the bend member.

FIG. 11 shows another example of the bend member. The first, second, third, and fourth bend members may be formed from e.g. a semicircular member as shown in FIG. 11, instead of the liner member. In the case of a semicircular plate member as well, the line joining the central coupling point and the one-end coupling point and the line joining the central coupling point and the other-end coupling point form a V shape with a fixed bend angle. In place of the semicircular plate member, a V-shaped member, a U-shaped member, or a three-dimensional object may be employed.

FIG. 12 shows another example of the bend member. In the shown example, the line "a" joining the central coupling point and the one-end coupling point is longer than a line "b" joining the central coupling point and the other-end coupling point.

FIG. 13 shows still another example of the bend member. In the bend member on one hand, the length "a" of the line joining the central coupling point and the upper one-end coupling point is longer than a length "b" joining the central coupling point and the lower other-end coupling point. In the bend member on the other, the line "b" joining the central coupling point and the upper one-end coupling point is shorter than the line "a" joining the central coupling point and the lower other-end coupling point. The central coupling point of the bend member on one hand and the central coupling point of the bend member on the other are pivotally coupled together via the coupling member 5.

<Embodiment Shown in FIG. 14 to FIG. 16>

FIG. 14 shows a structure coupling in the X direction the first bend member 1, second bend member 2, third bend member 3, and fourth bend member 4 which are of a semicircular arc shape and are the same in shape and size. Although the contour of each bend member is a semicircular arc, the line joining the central coupling point and the one-end coupling point and the line joining the central coupling point and the other-end coupling point, of each bend member, form a V shape with a fixed bend angle.

In the structure shown in FIG. 14, the first bend member 1 and the second bend member 2 are pivotally coupled together at their central coupling points. Similarly, the third bend member 3 and the fourth bend member 4 are pivotally coupled together at their central coupling points. The one-end coupling point of the third bend member 3 is pivotally coupled to the one-end coupling point of the first bend member 1, while the one-end coupling point of the fourth bend member 4 is pivotally coupled to the one-end coupling point of the second bend member 2. Repetition of such a coupled structure of the first to fourth bend members forms a linear portion of the variable shape frame or forms a liner row extending in the X direction or the Y direction.

A shape shown in FIG. 15 is obtained when operating, from the state of FIG. 14, the other-end coupling point of the leftmost first bend member 1 and the other-end coupling point of the leftmost second bend member 2 so as to come closer to each other and further operating the other-end coupling point of the rightmost third bend member 3 and the other-end coupling point of the rightmost fourth bend member 4 so as to come closer to each other.

A shape shown in FIG. 16 is obtained when operating, from the state of FIG. 14, the other-end coupling point of the leftmost first bend member 1 and the other-end coupling point of the leftmost second bend member 2 so as to move away from each other and further operating the other-end coupling point of the rightmost third bend member 3 and the other-end coupling point of the rightmost fourth bend member 4 so as to move away from each other.

The shape of FIG. 15 or 16 changed from the original shape of FIG. 14 is beyond the easily predictable range and therefore is visually intriguing.

Figure 17:
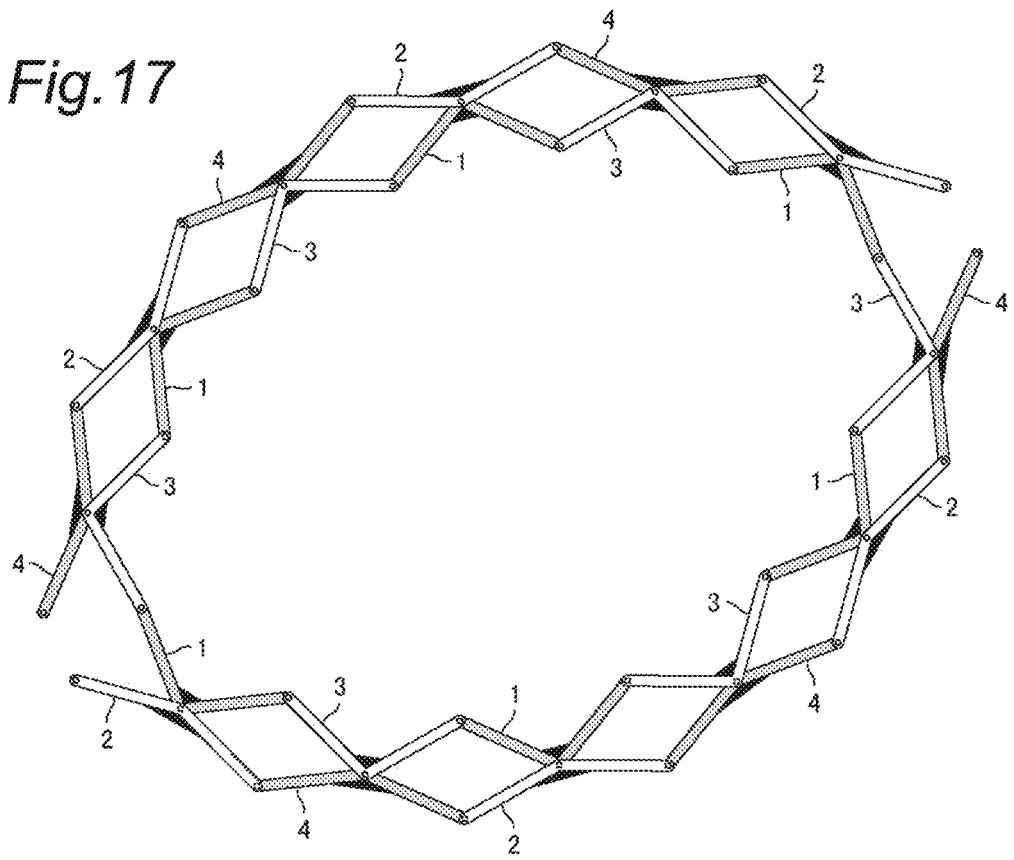
FIG. 17 is a front view of a variable shape frame according to an embodiment of the present invention.
Figure 18:
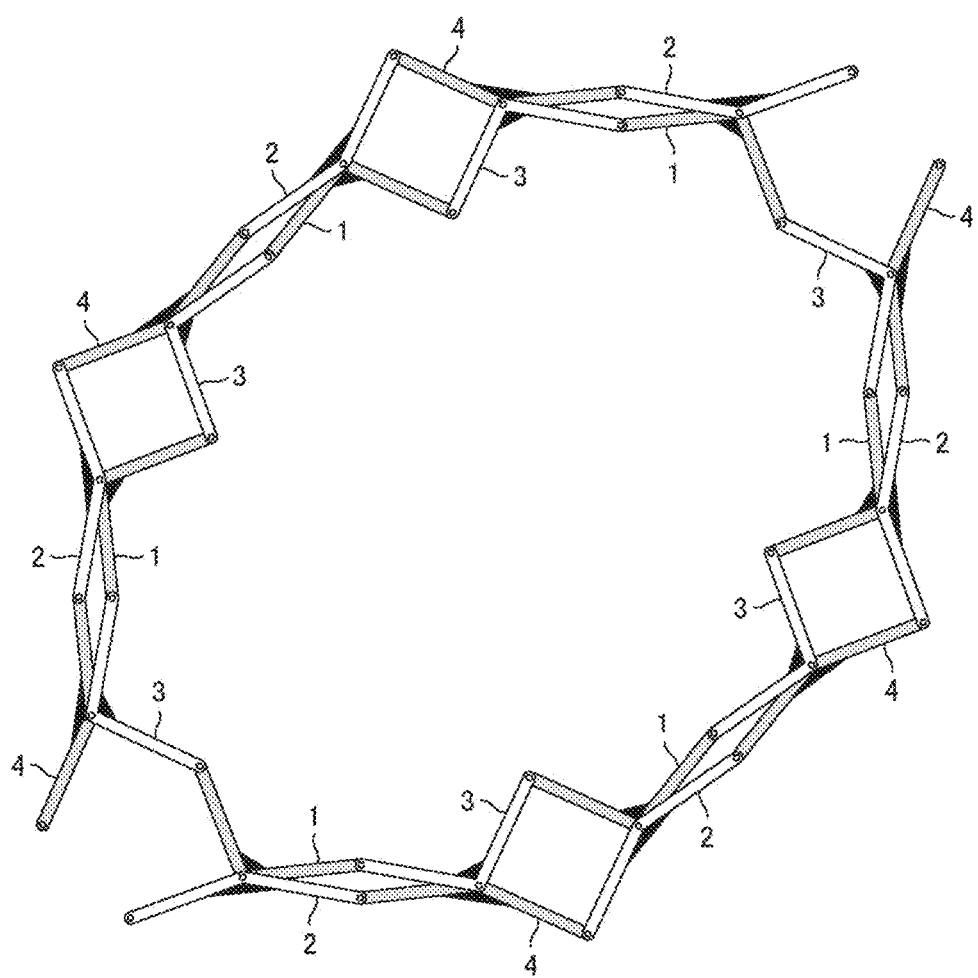
FIG. 18 is a front view showing a shape changed from the state shown in FIG. 17.
Figure 19:
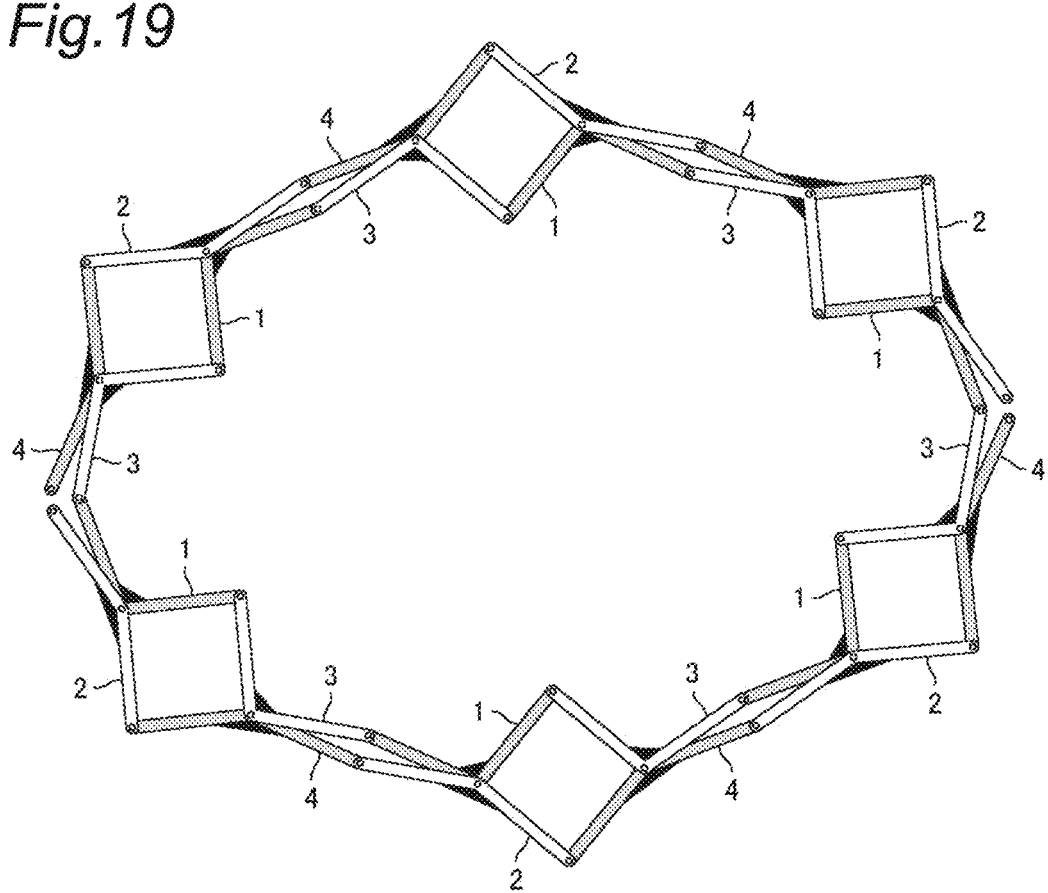
FIG. 19 is a front view showing another example of the shape changed from the state shown in FIG. 17.

<Embodiment Shown in FIG. 17 to FIG. 19>

FIG. 17 to FIG. 19 show an example of the variable shape frame. In the shown embodiment, the first bend member 1 and the third bend member 3 are the same in shape and size and each have the central coupling point, the one-end coupling point, and the other-end coupling point that are arranged so as to form a V shape with the same fixed bend angle. The second bend member 2 and the fourth bend member 4 are the same in shape and size and each have the central coupling point, the one-end coupling point, and the other-end coupling point that are arranged so as to form a V shape with the same fixed bend angle. The fixed bend angle of the second bend member 2 and the fourth bend member 4 is greater than the fixed bend angle of the first bend member 1 and the third bend member 3.

Similarly to the embodiment shown in FIG. 14, the first bend member 1 and the second bend member 2 are pivotally coupled together at their central coupling points. The third bend member 3 and the fourth bend member 4 are also pivotally coupled together at their central coupling points. The one-end coupling point of the third bend member 3 is pivotally coupled to the one-end coupling point of the first bend member 1, while the one-end coupling point of the fourth bend member 4 is pivotally coupled to the one-end coupling point of the second bend member 2. By repeating such a coupled structure of the first to fourth bend members, a generally elliptical variable shape frame is formed. At this time, the second bend member 2 and the fourth bend member 4 having a larger fixed bend angle lie outside the frame, while the first bend member 1 and the third bend member 3 having a smaller fixed bend angle lie inside the frame.

To make the frame variable in shape, as shown in FIG. 17, the other end of the leftmost second bend member 2 of the frame and the other end of the leftmost fourth bend member 4 of the frame are separated from each other without being coupled together, and then, the one end of the rightmost second bend member 2 of the frame and the one end of the rightmost fourth bend member 4 of the frame are separated from each other without being coupled together.

The shape turns to one shown in FIG. 18 when operating, from the state of FIG. 17, the other end of the leftmost second bend member 2 and the other end of the leftmost fourth bend member 4 so as to move away from each other and then operating the one end of the rightmost second bend member 2 and the one end of the rightmost fourth bend member 4 so as to move away from each other.

On the contrary, the shape turns to one shown in FIG. 19 when operating the other end of the leftmost second bend member 2 and the other end of the leftmost fourth bend member 4 so as to come closer to each other and then operating the one end of the rightmost second bend member 2 and the one end of the rightmost fourth bend member 4 so as to come closer to each other.

The shape of FIG. 18 or 19 changed from the original shape of FIG. 17 is beyond the easily predictable range and therefore is visually intriguing.

<Another Example of Bend Member>

Figure 20:
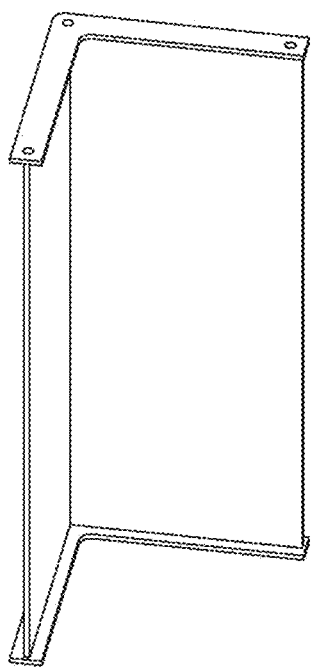
FIG. 20 is a perspective view of a bend member with a vertically elongated shape.

FIG. 20 shows another example of the bend member. As shown in FIG. 20, the first bend member, the second bend member, the third bend member, and the fourth bend member may be of a vertically (in height direction) elongated shape. In this case, a vertically elongated rigid plate may be used as the bend member. Alternatively, a pair of bend members positioned vertically apart from each other may be disposed such that a sheet or a panel is arranged between the pair of bend members.

Figure 21:
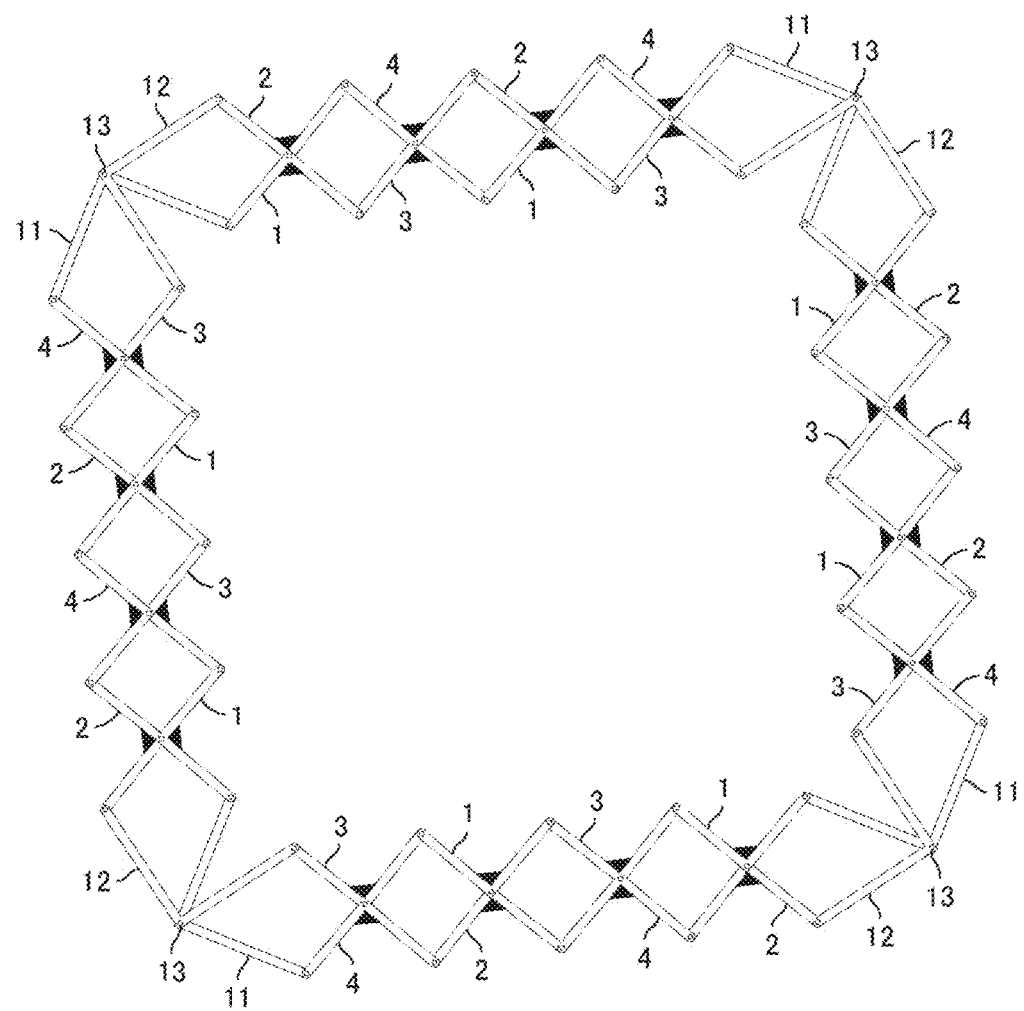
FIG. 21 is a front view of a variable shape frame according to an embodiment of the present invention.
Figure 22:
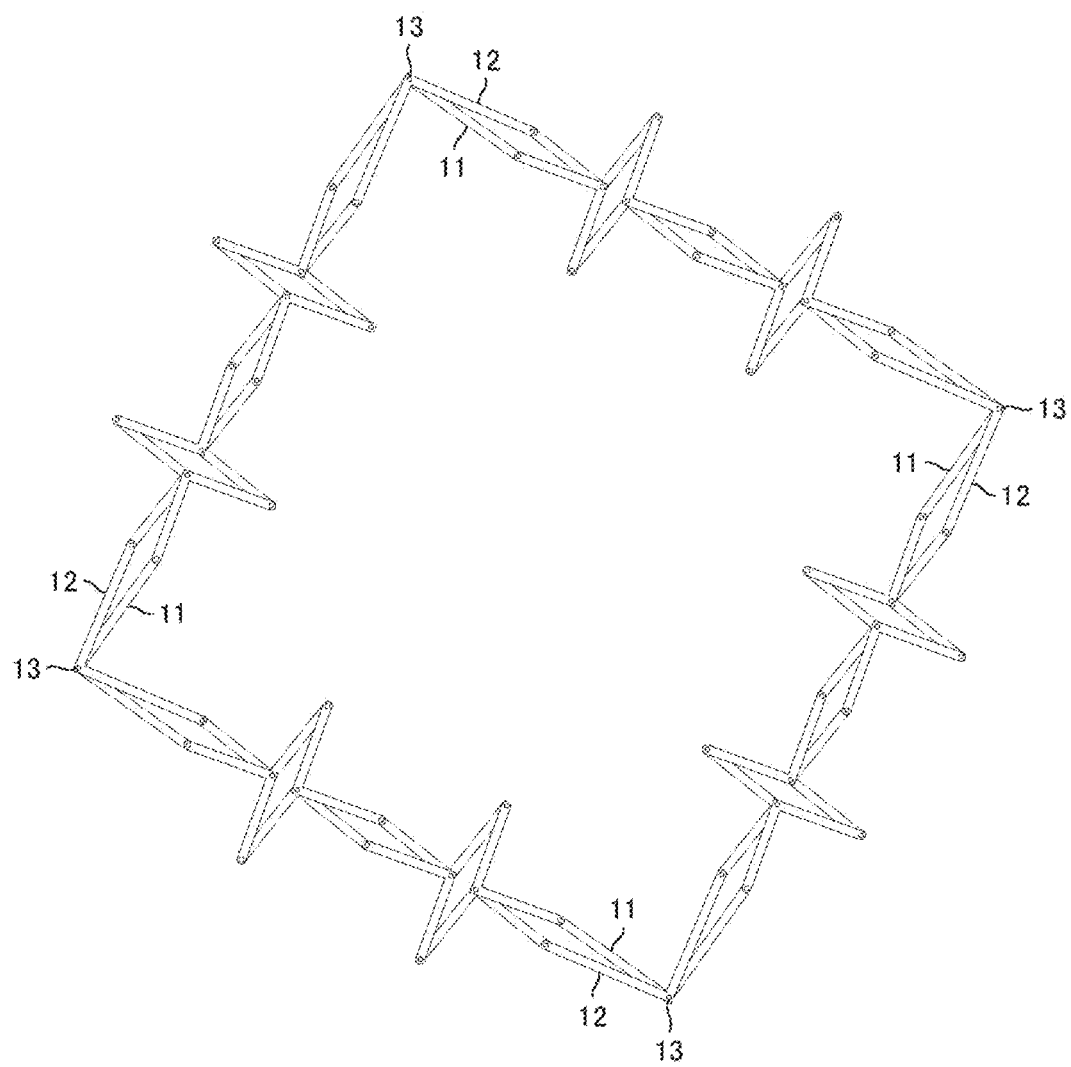
FIG. 22 is a front view showing a shape changed from the state shown in FIG. 21.
Figure 23:
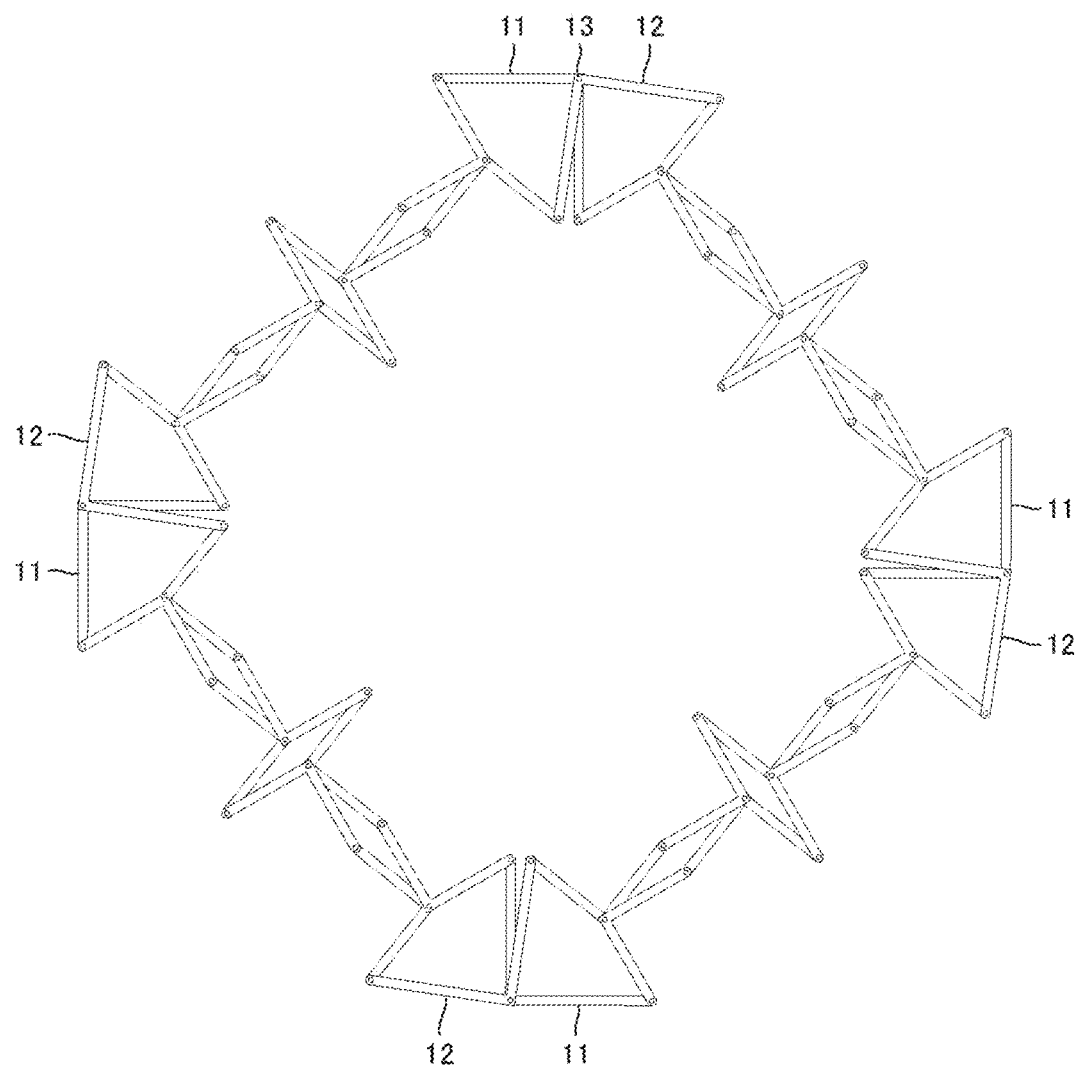
FIG. 23 is a front view showing another example of the shape changed from the state shown in FIG. 21.

<Embodiment Shown in FIG. 21 to FIG. 23>

FIG. 21 to FIG. 23 show another example of the variable shape frame. The shown variable shape frame is in the form of a quadrangular frame having four corners.

The sides are made up of a coupled structure of the first bend member 1, the second bend member 2, the third bend member 3, and the fourth bend member 4. The first bend member 1 and the second bend member 2 are pivotally coupled together at their central coupling points and, similarly, the third bend member 3 and the fourth bend member 4 are pivotally coupled together at their central coupling points. The first bend member 1 and the third bend member 3 are pivotally coupled together at their one-end coupling points or other-end coupling points and, similarly, the second bend member 2 and the fourth bend member 4 are pivotally coupled together at their one-end coupling points or other-end coupling points. The first bend member 1 and the third bend member 3 lie inside the frame, while the second bend member 2 and the fourth bend member 4 lie outside the frame.

In the shown embodiment, the first, second, third, and fourth bend members are of the same shape and of the same size.

A first bent member 11, a second bent member 12, and a corner coupling shaft 13 are disposed at each of the corners of the quadrangular frame shown in FIG. 21. The first bent member 11 and the second bent member 12 are bend members having the same bend angle and the same shape. The corner coupling shaft 13 couples the first bent member 11 and the second bent member 12 together pivotally at an intersection thereof. Specifically, the corner coupling shaft 13 pivotally couples together a bend of the first bent member 11 and a bend of the second bent member 12.

One end of the first bent member 11 is pivotally coupled to the one-end coupling point or the other-end coupling point of the bend member adjacent thereto on one side, while the other end of the first bent member 11 is pivotally coupled to the one-end coupling point or the other-end coupling point of the bend member adjacent thereto on the other side. In the same manner, one end of the second bent member 12 is pivotally coupled to the one-end coupling point or the other-end coupling point of the bend member adjacent thereto on one side, while the other end of the second bent member 12 is pivotally coupled to the one-end coupling point or the other-end coupling point of the bend member adjacent thereto on the other side.

Specifically, the first bent member 11 is pivotally coupled, at its one end, to the other-end coupling point of the first bend member 1 adjacent thereto on one side and is pivotally coupled, at its other end, to the other-end coupling point of the fourth bend member 4 adjacent thereto on the other side. The second bent member 12 is pivotally coupled, at its one end, to the other-end coupling point of the second bend member 2 adjacent thereto on one side and is pivotally coupled, at its other end, to the other-end coupling point of the third bend member 3 adjacent thereto on the other side.

The shape changes to one shown in FIG. 22 when operating to pivot, from the state of FIG. 21, the second bent member 12 positioned at each corner of the frame in a direction coming closer to the first bent member 11, that is, in the clockwise direction in the diagram.

On the other hand, the shape changes to one shown in FIG. 23 when operating to pivot, from the state of FIG. 21, the second bent member 12 positioned at each corner of the frame in a direction moving away from the first bent member 11, that is, in the counterclockwise direction in the diagram.

The shape of FIG. 22 or 23 changed from the original shape of the frame shown in FIG. 21 is beyond the easily predictable range and accordingly is visually intriguing.

In the case of the quadrangular frame shown in FIG. 21 to FIG. 23, the bend angle of the first bent member 11 and the second bent member 12 is 90 degrees. Frames other than the quadrangle may be formed using the first bend member 1, the second bend member 2, the third bend member 3, the fourth bend member 4, and the pair of bent members. For example, in case of forming an n-sided frame, if the sum of the internal angles of the n-sided polygon is A degrees, then the bent angle (bend angle) of the first and second bent members is desirably A/n. That is, in case of forming a triangular frame, the bent angle of the first and the second bent members is 60 degrees. In case of forming a pentagonal frame, the bent angle of the first and second bent members is 108 degrees. In case of forming a hexagonal frame, the bent angle of the first and second bent members is 120 degrees.

The shape of the variable shape frame is not limited to regular polygons. For example, the shape with corners may be a star-shaped frame or a frame in which a series of arc-shaped structural elements are coupled together via the pair of bent members.

Figure 24:
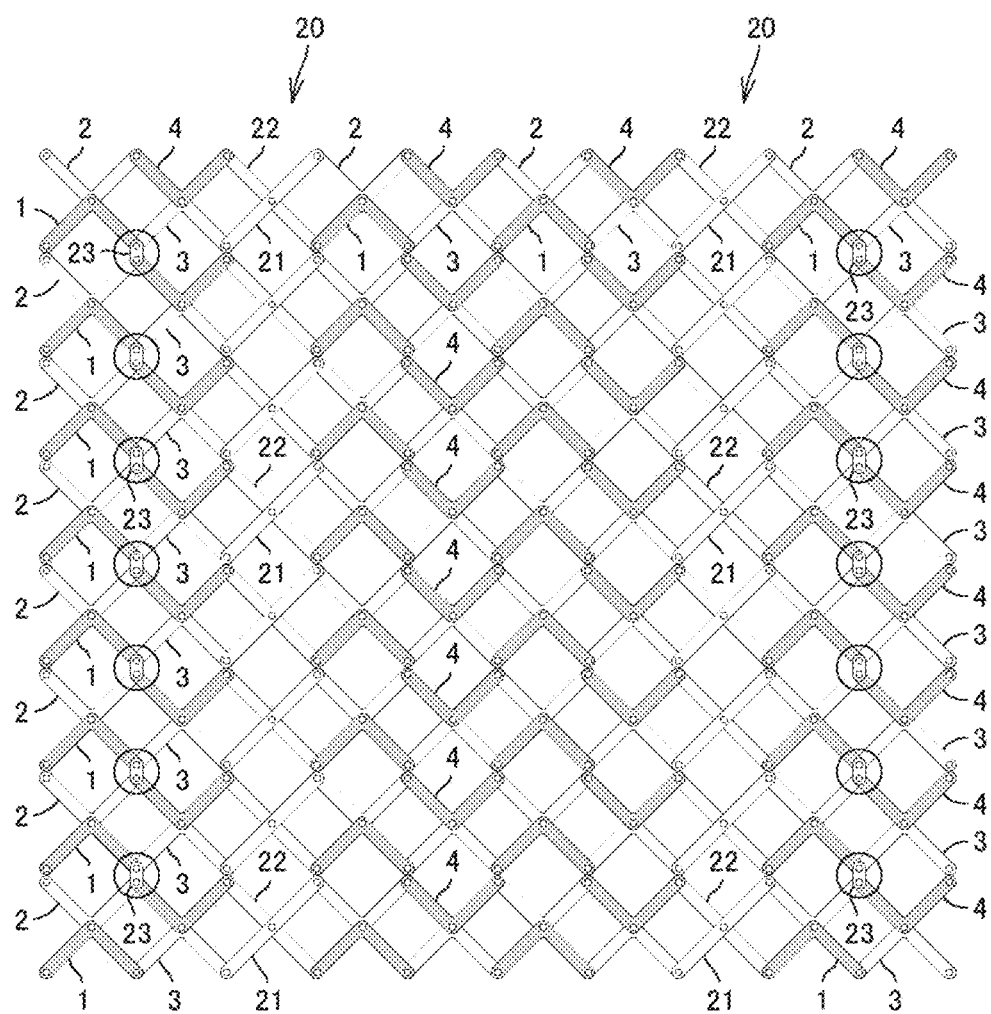
FIG. 24 is a front view of a variable shape panel according to an embodiment of the present invention.
Figure 25:
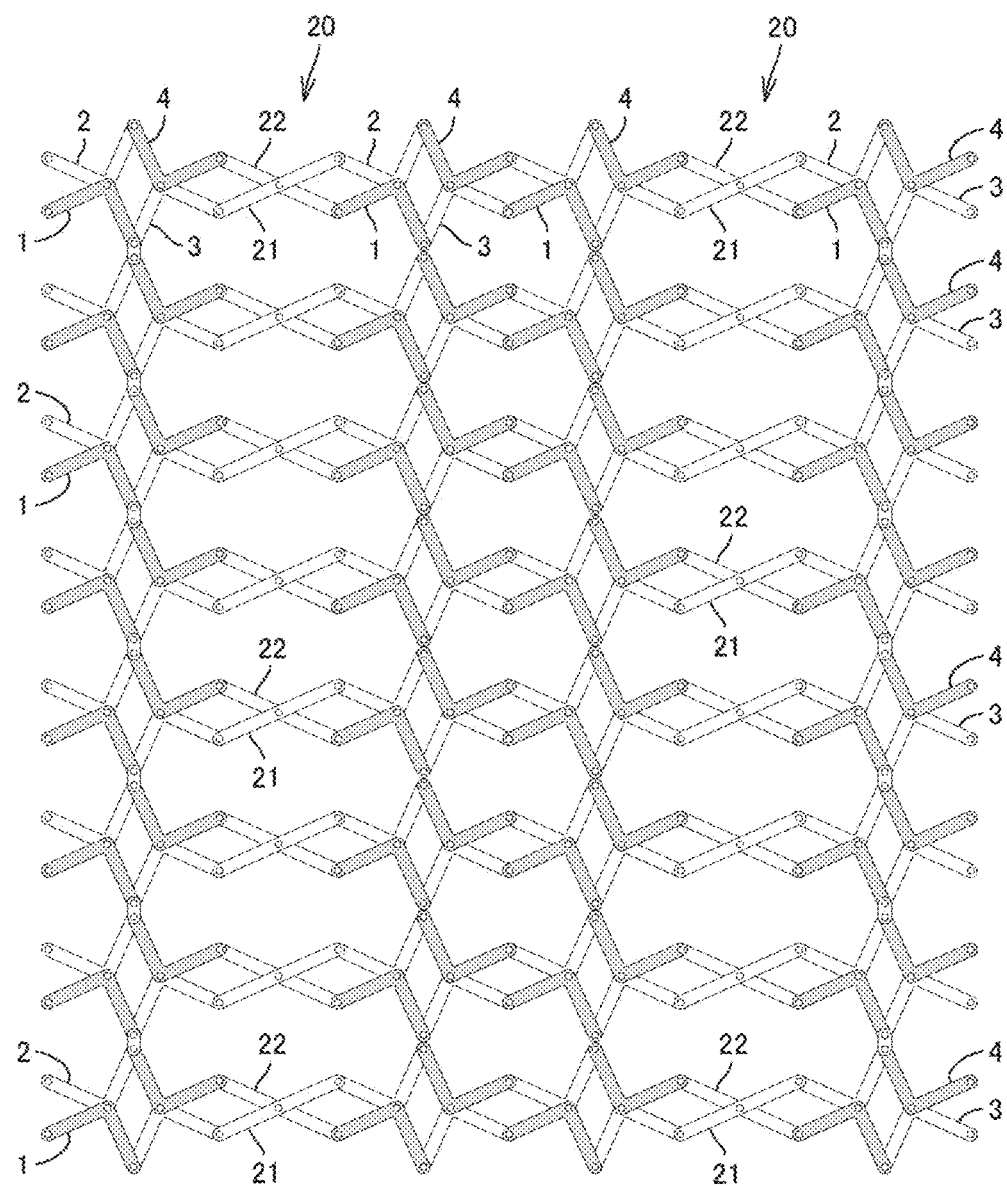
FIG. 25 is a front view showing a shape changed from the state shown in FIG. 24.
Figure 26:
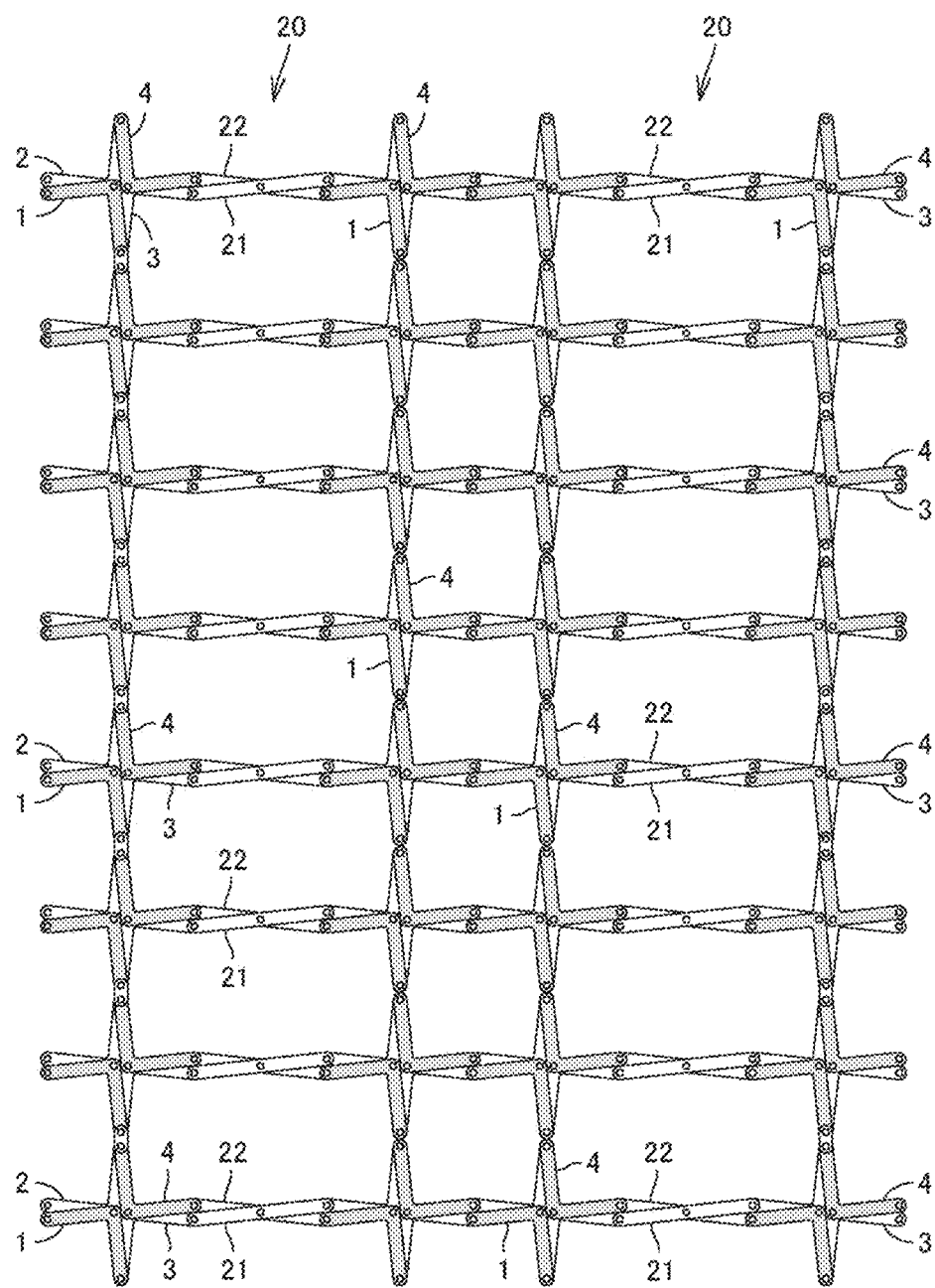
FIG. 26 is a front view showing a shape further changed from the state shown in FIG. 25.

<Embodiment Shown in FIG. 24 to FIG. 26>

FIG. 24 to FIG. 26 show an example of the variable shape panel. The shown variable shape panel includes the first bend member 1, the second bend member 2, the third bend member 3, the fourth bend member 4, a cross unit 20, and a coupling member 23. The first, second, third, and fourth bend members have the same shape and the same size. To take notice of a uppermost row of rows extending in the X direction, from left to right, a structure coupling the first to fourth bend members together is followed by a single of the cross unit 20, which is followed by a structure in which the first to fourth bend members are again coupled together repeatedly plural times, which is followed by a single of the cross unit 20, after which the structure coupling the first to fourth bend members together continues. A plurality of rows each extending in the X direction are arrayed along the Y direction. Two series structures extending in the X direction and adjacent to each other in the Y direction are coupled together via two of the coupling members 23.

Taking notice of a single row structure extending in the X direction, a more specific description will be given. The leftmost first bend member 1 and the second bend member 2 adjacent thereto in the Y direction are pivotally coupled together at their central coupling points. The first bend member 1 and third bend member 3 adjacent in the X direction are pivotally coupled together at their one-end coupling points. The second bend member 2 and fourth bend member 4 adjacent in the X direction are pivotally coupled together at their one-end coupling points.

The cross unit 20 includes two linear members 21 and 22 crossing in an X shape and pivotally coupled together at an intersection thereof and has four end coupling points. Two of the end coupling points lying on one side (left side in the diagram) of the cross unit 20 are pivotally coupled to the other-end coupling points of the third bend member 3 and fourth bend member 4 that are adjacent thereto on one side. Two of the end coupling points lying on the other side (right side in the diagram) of the cross unit 20 are pivotally coupled to the other-end coupling points of the first bend member 1 and second bend member 2 that are adjacent thereto on the other side.

The leftmost first bend member 1 and the rightmost third bend member 3 of a series of structural elements of each row aligned in the X direction are pivotally coupled, at their one-end coupling points or other-end coupling points, to the one-end coupling points or other-end coupling points of the leftmost second bend member 2 and the rightmost fourth bend member 4 of a series of structural elements of a row directly below adjacent in the Y direction. Specifically, the coupling member 23 on one hand (lying on the left side) couples together pivotally the one-end coupling point of the first bend member 1 and the one-end coupling point of the second bend member 2 lying below (adjacent in the Y direction). The coupling member 23 on the other (lying on the right side) couples together pivotally the one-end coupling point of the third bend member 3 and the one-end coupling point of the fourth bend member 4 lying below (adjacent in the Y direction).

In FIG. 24, a portion enclosed by a small circle is a coupling portion of a series of structural elements adjacent vertically (in the Y direction).

The shape varies to one shown in FIG. 25 when operating, from the state of FIG. 24, the other-end coupling point of the leftmost first bend member 1 of a series of structural elements of each row aligned in the X direction and the other-end coupling point of the leftmost second bend member 2 so as to come closer to each other and further operating the other-end coupling point of the rightmost third bend member 3 and the other-end coupling point of the rightmost fourth bend member 4 so as to come closer to each other. The shape varies to one shown in FIG. 26 when operating the other-end coupling points of the first and second bend members so as to come even closer to each other and operating the other-end coupling points of the third and fourth bend members so as to come even closer to each other.

The shape of FIG. 25 or 26 changed from the original shape of the panel shown in FIG. 24 is beyond the easily predictable range and accordingly greatly stimulates visual interest.

In the embodiment shown in FIG. 24 to FIG. 26, the cross units 20 are aligned in the Y direction. As an application example, cross units 20 may be aligned in the X direction or the cross units aligned in the X direction may be disposed in addition to the cross units aligned in the Y direction.

Figure 27:
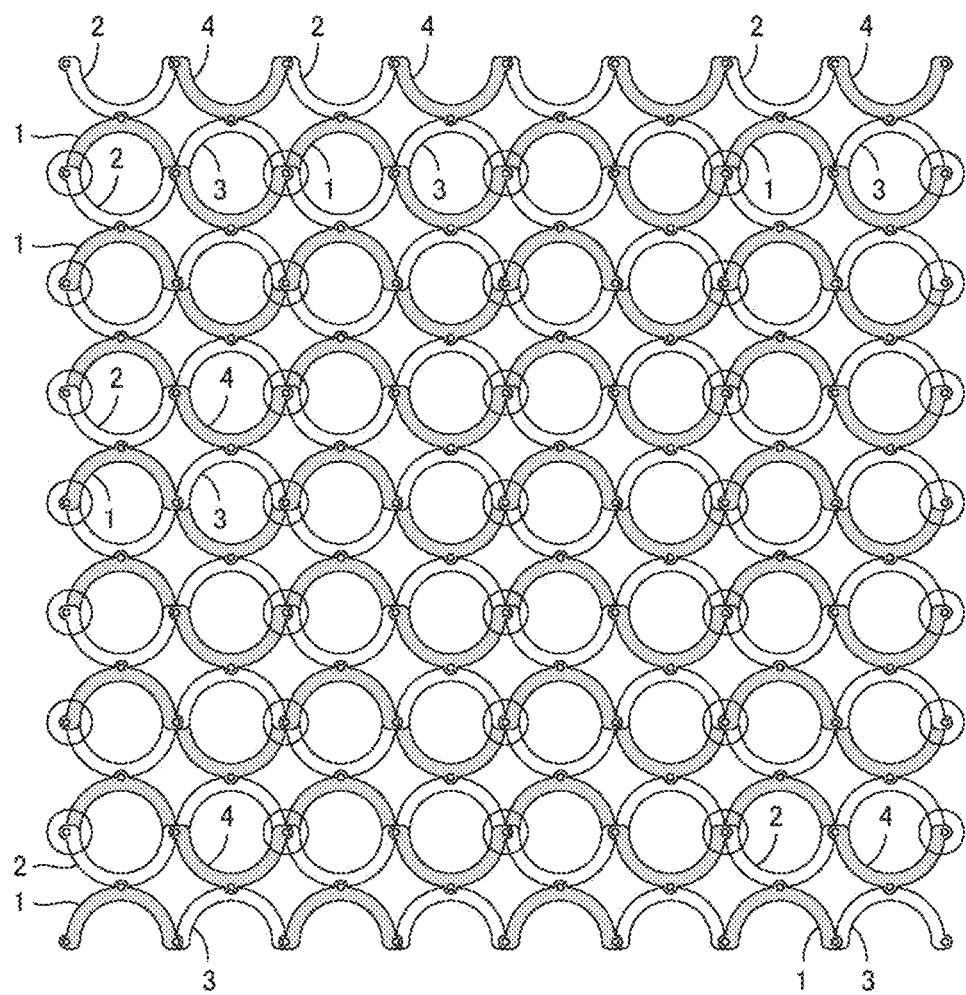
FIG. 27 is a front view of a variable shape panel according to still an embodiment of the present invention.
Figure 28:
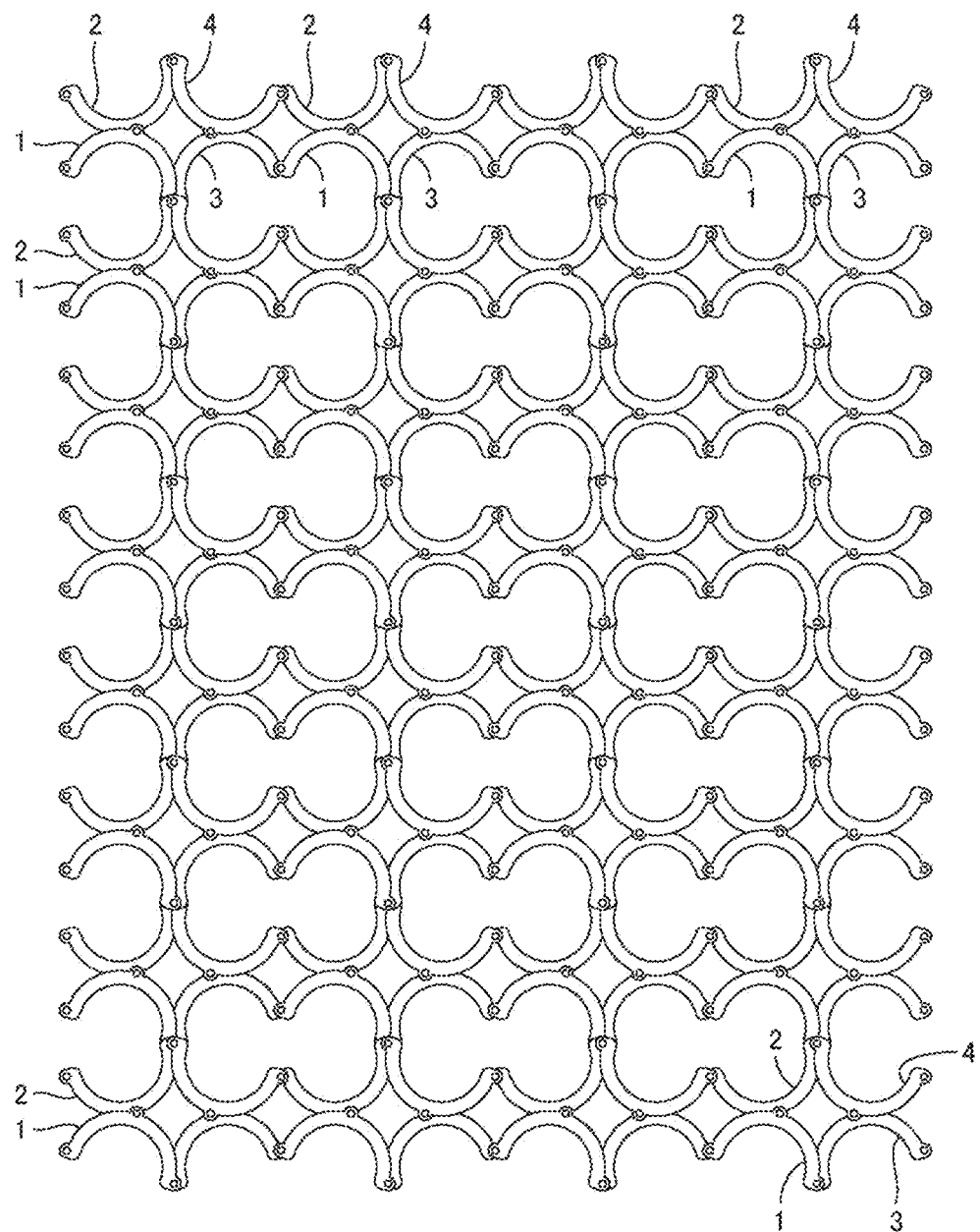
FIG. 28 is a front view showing a shape changed from the state shown in FIG. 27.
Figure 29:
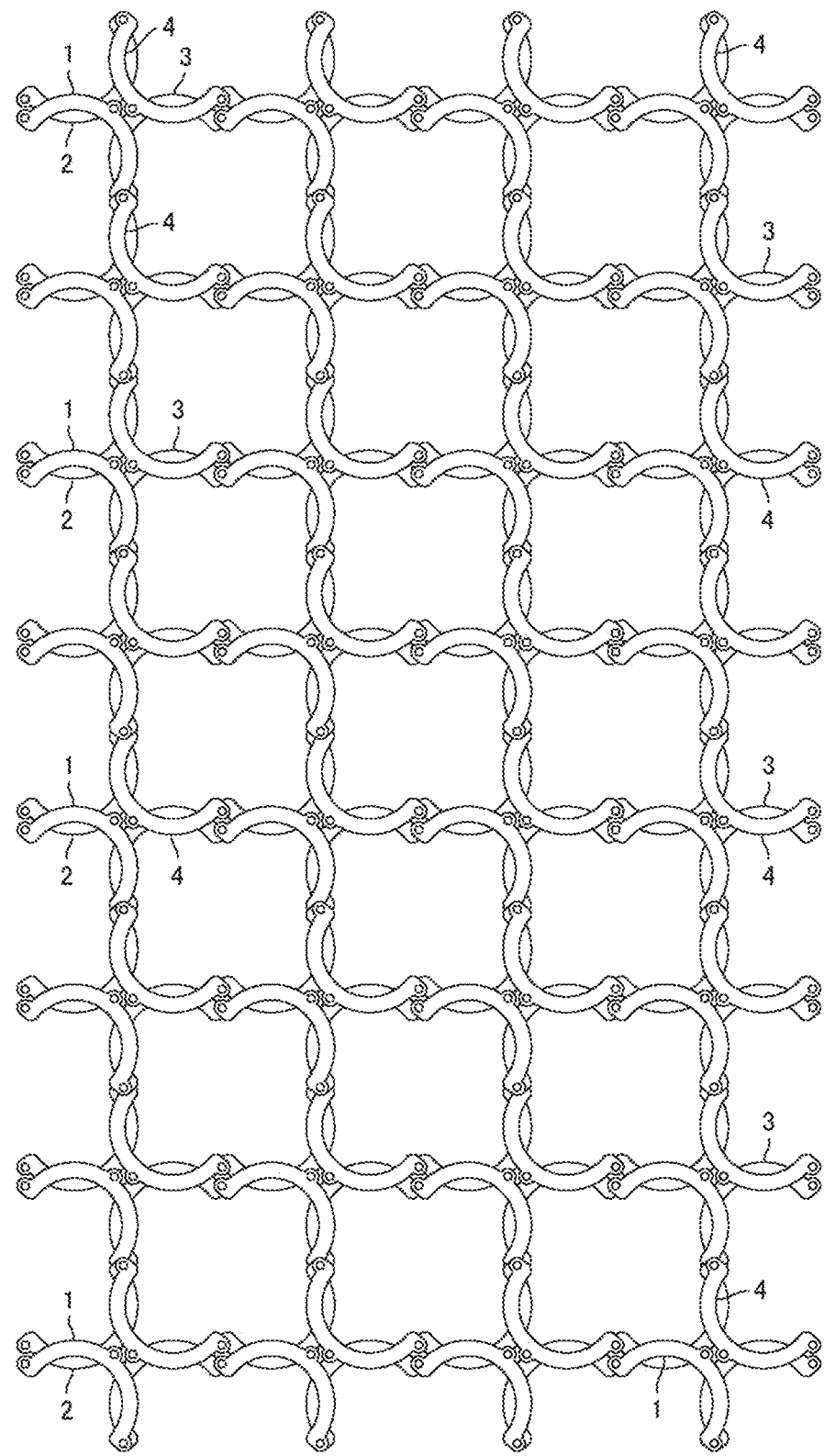
FIG. 29 is a front view showing a shape further changed from the state shown in FIG. 28.

<Embodiment Shown in FIG. 27 to FIG. 29>

FIG. 27 to FIG. 29 show another example of the variable shape panel. The shown variable shape panel includes the first bend member 1 of a semicircular arc shape, the second bend member 2 of the same shape, the third bend member 3 of the same shape, and the fourth bend member 4 of the same shape, which are coupled together in the X direction and in the Y direction. The first, second, third, and fourth bend members are of the same shape and of the same size.

Taking notice of a series of structural elements aligned in the X direction, a more specific description will be given. The first bend member 1 and the second bend member 2 adjacent in the Y direction are pivotally coupled together at the central coupling points. The first bend member 1 and the third bend member 3 adjacent in the X direction are pivotally coupled together at the one-end coupling points. The second bend member 2 and the fourth bend member 4 adjacent in the X direction are pivotally coupled together at the one-end coupling points.

A plurality of rows each extending in the X direction are arrayed along the Y direction. To allow a change in shape of the panel, two structures adjacent in the Y direction and each extending in the X direction are coupled together partially pivotally. In FIG. 27, a portion enclosed by a small circle is a portion where vertically adjacent rows are not coupled together so that the upper and lower rows are separable at that portion. At a portion not enclosed by a circle, vertically adjacent X-direction rows are pivotally coupled together.

To take notice of the portion enclosed by a circle, the other-end coupling point of the first bend member 1 of one row is not coupled to and is separable from the other-end coupling point of the second bend member 2 of the row positioned therebelow. On the contrary, the one-end coupling point of the first bend member 1 of one row is pivotally coupled to the one-end coupling point of the second bend member 2 of the row positioned therebelow.

The shape turns to one shown in FIG. 28 when operating, from the state of FIG. 27, the other-end coupling point of the leftmost first bend member 1 of a series of structural elements of each row aligned in the X direction and the other-end coupling point of the leftmost second bend member 2 so as to come closer to each other and further operating the other-end coupling point of the rightmost third bend member 3 and the other-end coupling point of the rightmost fourth bend member 4 so as to come closer to each other. The shape turns to one shown in FIG. 29 when operating the other-end coupling points of the first and second bend members 1 and 2 to come even closer to each other and operating the other-end coupling points of the third and fourth bend members 3 and 4 so as to come even closer to each other.

The shape of FIG. 28 or 29 changed from the original shape of the panel shown in FIG. 27 is beyond the easily predictable range and accordingly greatly stimulates a person's visual interest.

The embodiment shown in FIG. 27 to FIG. 29 may include the cross unit 20 employed in the embodiment of FIG. 24 to FIG. 26. In this case, as one example, the linear members 21 and 22 making up each cross unit 20 are preferably of a shape that draws an S-shaped curve. A plurality of cross units may be aligned in the X direction, or in Y direction, or in both the X and Y directions.

<Panel Forming Cylindrical Surface, Etc.>

Figure 30:
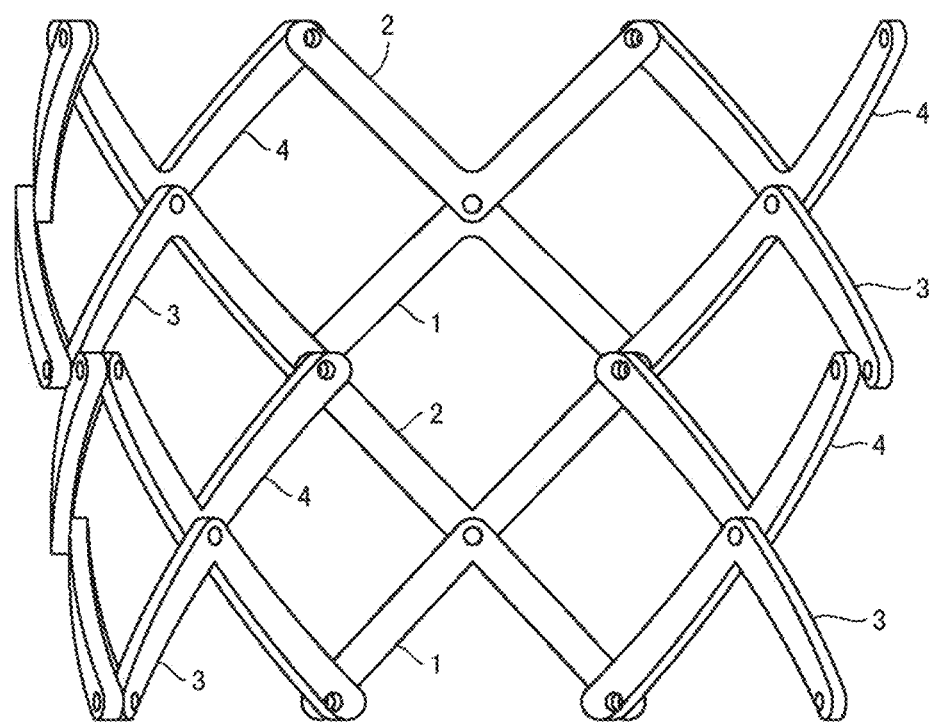
FIG. 30 is a perspective view of a variable shape panel forming part of a cylindrical surface.

FIG. 30 shows another example of the first bend member 1, the second bend member 2, the third bend member 3, and the fourth bend member 4. Each bend member has a shape curved in the plate thickness direction. In this manner, the first to the fourth bend members may be made up of the members curved in the plate thickness direction. A variable shape panel shown in FIG. 30 is created by coupling, in the X and Y directions, a plurality of bend members each curved in the plate thickness direction and it forms a cylindrical surface.

By appropriately selecting the degree of curvature of each bend member, panels with various forms of surfaces including a spherical surface can be formed. By combining a plurality of panels, a three-dimensional structural object can also be formed.

Figure 31A:
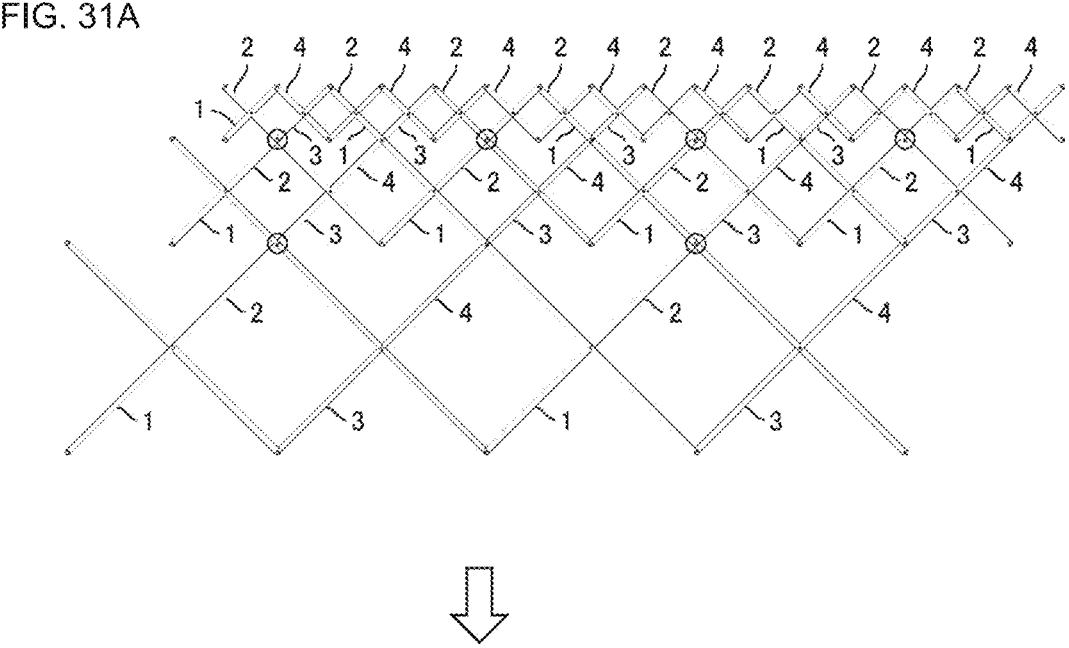
FIG. 31A and FIG. 31B are front views of a variable shape panel according to an embodiment of the present invention, FIG. 31A showing its original shape, FIG. 31B showing its changed shape.
Figure 31B:
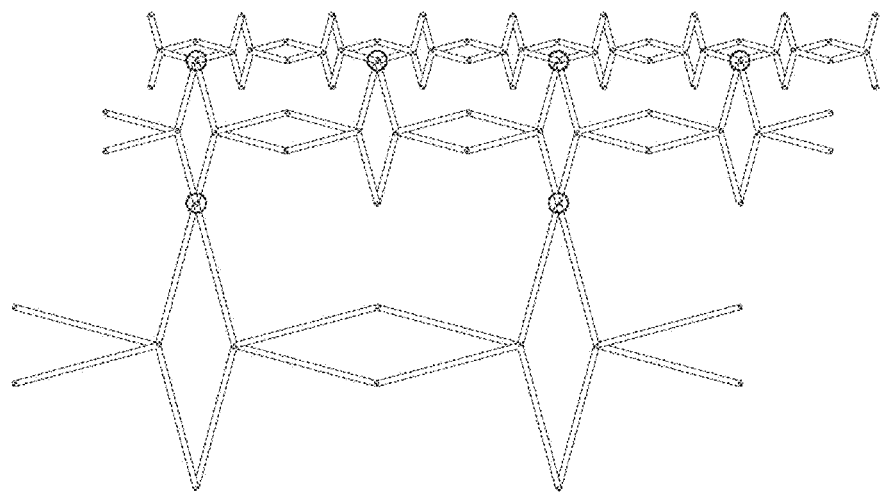

<Embodiment Shown in FIG. 31A and FIG. 31B>

FIG. 31A and FIG. 31B show a variable shape panel according to another embodiment of the present invention. The shown embodiment has three rows of series structures extending along the X direction. The uppermost series structure row includes the first bend member 1, the second bend member 2, the third bend member 3, and the fourth bend member 4, which are of a minimum size and coupled together in a pivotal manner. This coupling mode is the same as that of the embodiment shown in FIG. 4 and hence will not again be described. The first, second, third, and fourth bend members making up the series structure extending along the X direction are of the same shape and of the same size.

The first, second, third, and fourth bend members making up the intermediate series structure row when viewed in the Y direction have the same shape as that of the bend members of the upper series structure row, but have a larger size. The first, second, third, and fourth bend members forming the intermediate series structure are of the same shape and of the same size.

The first, second, third, and fourth bend members making up the lowermost series structure row when viewed in the Y direction have the same shape as that of the bend members of the intermediate series structure row, but have a larger size. The first, second, third, and fourth bend members forming the lowermost series structure row are of the same shape and of the same size.

In FIG. 31A and FIG. 31B, a portion enclosed by a circle is a coupling portion at which vertically adjacent series structure rows are pivotally coupled together.

The shape changes to one shown in FIG. 31B when operating, from the state of FIG. 31A, the other-end coupling point of the leftmost bend member 1 for example in the intermediate and lowermost rows and the other-end coupling point of the leftmost bend member 2 to move away from each other. The shape of FIG. 31B changed from the original shape of the panel shown in FIG. 31A is beyond the easily predictable range and accordingly greatly stimulates a person's visual interest.

<Embodiment Shown in FIG. 32A and FIG. 32B, FIG. 33A and FIG. 33B>

As a basic way of thinking, an embodiment shown in FIG. 32A to FIG. 33B is a variable shape panel in which the semicircular arc-shaped first, second, third, and fourth bend members of FIG. 14 are juxtaposed in the X and Y directions. However, a remarkable feature of the shown embodiment lies in that "each bend member" is made up of an "extendable arm" capable of expansion and contraction.

A more detailed description will be given. The variable shape panel shown in FIG. 32A to FIG. 33B is obtained by coupling together a plurality of extendable arms adjacent in X and Y directions and includes a first bendable and extendable arm 31, a second bendable and extendable arm 32, a third bendable and extendable arm 33, and a fourth bendable and extendable arm 34.

Figure 32A:
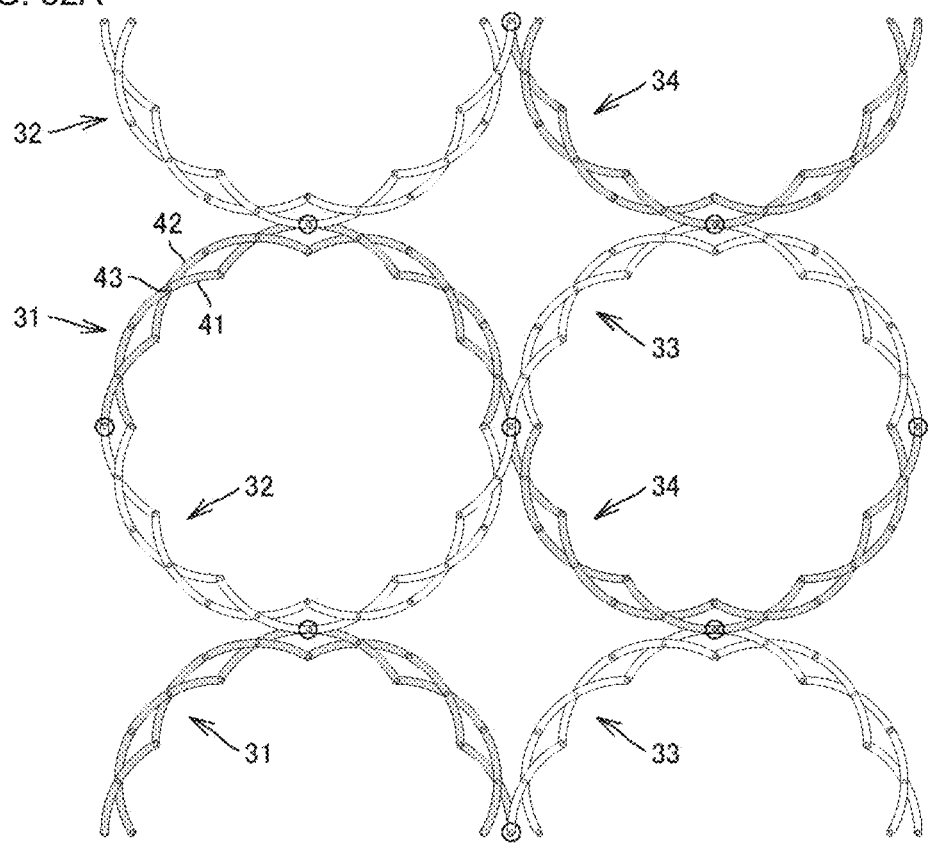
FIG. 32A and FIG. 32B are front views of a variable shape panel according to an embodiment of the present invention, FIG. 32A showing its original shape, FIG. 32B showing its change in shape after contraction.
Figure 32A:

The first bendable and extendable arm 31 has a first central coupling point, a first one-end coupling point, and a first other-end coupling point that are arranged so as to form a V shape with a fixed bend angle. The second bendable and extendable arm 32 has a second central coupling point, a second one-end coupling point, and a second other-end coupling point that are arranged so as to form a V shape with a fixed bend angle and lies adjacent to the first bendable and extendable arm 31 in the Y direction. The first central coupling point of the first bendable and extendable arm 31 and the second central coupling point of the second bendable and extendable arm 32 are pivotally coupled together. In FIG. 32A, a portion enclosed by a circle is a coupling portion.

The third bendable and extendable arm 33 has a third central coupling point, a third one-end coupling point, and a third other-end coupling point that are arranged so as to form a V shape with a fixed bend angle and lies adjacent to the first bendable and extendable arm 31 in the X direction. The third one-end coupling point of the third bendable and extendable arm 33 and the first one-end coupling point of the first bendable and extendable arm 31 are pivotally coupled together.

The fourth bendable and extendable arm 33 has a fourth central coupling point, a fourth one-end coupling point, and a fourth other-end coupling point that are arranged so as to form a V shape with a fixed bend angle and lies adjacent to the second bendable and extendable arm 32 in the X direction. The fourth one-end coupling point of the fourth bendable and extendable arm 34 is pivotally coupled to the second one-end coupling point of the second bendable and extendable arm 32. The fourth central coupling point of the fourth bendable and extendable arm 34 is pivotally coupled to the third central coupling point of the third bendable and extendable arm 33.

As shown, each of the bendable and extendable arms 31, 32, 33, and 34 includes linearly juxtaposed cross units. In the shown mode, the cross units are juxtaposed in a semicircular arc shape.

Figure 33A:
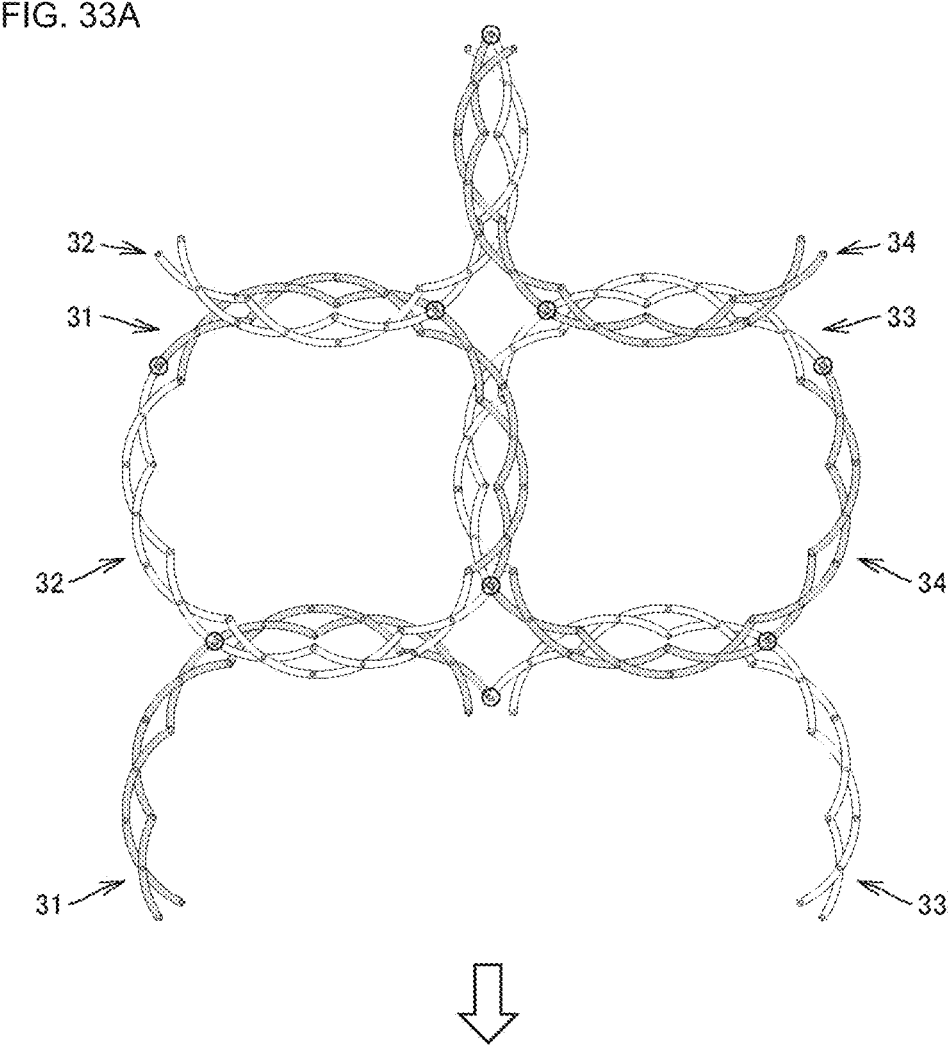
FIG. 33A and FIG. 33B are front views showing a change in shape made up of first to fourth bend extendable arms, of the variable shape panel of FIG. 32A and FIG. 32B, with FIG. 33A showing its original shape, FIG. 33B showing its change in shape after contraction.

Each cross unit includes a first linear member 41, a second linear member 42 intersecting the first linear member 41, and a pivot shaft 43 via which the first linear member 41 and the second linear member 42 are pivotally coupled together at the intersection. The bendable and extendable arms 31, 32, 33, and 34 are each capable of expansion and contraction. As shown in FIG. 33A, the bendable and extendable arms 31, 32, 33, and 34 each form a semicircular arm in the expanded state.

In FIG. 32A the bendable and extendable arms 31, 32, 33, and 34 are each in the expanded state. When contracting, from this state, the bendable and extendable arms 31, 32, 33, and 34, a mode of FIG. 32B) appears. In the states shown in FIG. 32A and FIG. 32B there is no change in the positional relationships between the bendable and extendable arms.

FIG. 33A shows a state where the positional relationships between the bendable and extendable arms have been changed from the state of FIG. 32A. In FIG. 33A, the bendable and extendable arms 31, 32, 33, and 34 are each in the expanded state.

Figure 32B:
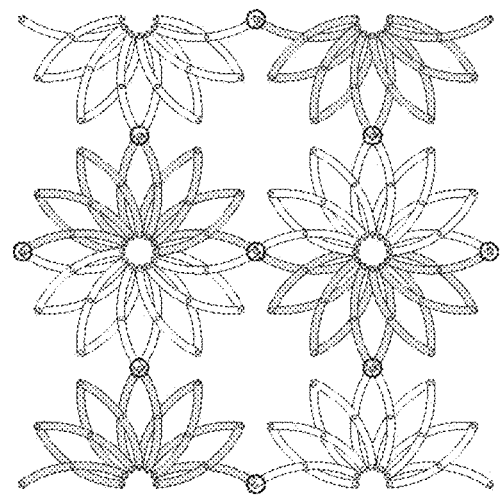
Figure 33B:
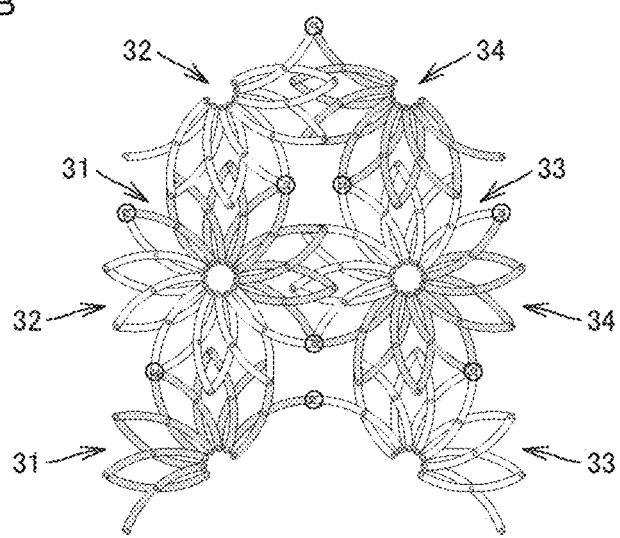

FIG. 33B shows a state where the positional relationships between the bendable and extendable arms have been changed from the state of FIG. 32B. In FIG. 33B, the bendable and extendable arms 31, 32, 33, and 34 are each in the contracted state.

The shape of FIG. 32B, FIG. 33A, and FIG. 33B changed from the original shape of the panel shown in FIG. 32A is beyond the easily predictable range and accordingly greatly stimulates a person's visual interest. The variable shape panel having such an extendable function has an improved mechanical convenience.

<Embodiment Shown in FIG. 34A to FIG. 36B>

Figure 34A:
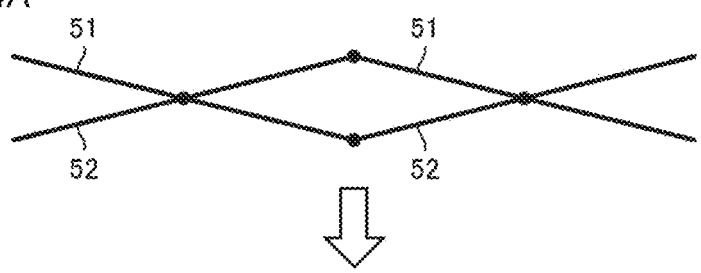
FIG. 34A and FIG. 34B are illustration diagrams of a contracting arm including two cross units coupled together, FIG. 34A showing the state of the arm extended in the length direction, FIG. 34B showing the state of the arm contracted in the length direction.
Figure 34B:
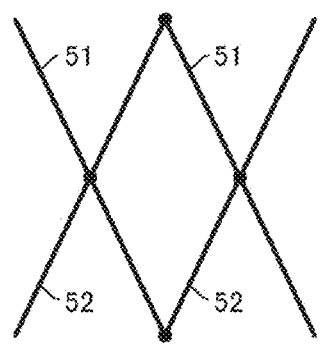

FIGS. 34A to 36B show an embodiment of an extendable arm structure according to the present invention. This extendable arm structure makes up each of sides of a variable shape frame shown in FIG. 37A and FIG. 37B that will be described later. FIG. 34A is an illustration diagram for explaining a basic idea. Referring to FIG. 34A, a basic configuration will be described. The extendable arm structure includes a plurality of cross units each having a first arm 51 and a second arm 52 that are crossed in an X shape at an intersection where both the arms are pivotally coupled together. The adjacent cross units are pivotally coupled together at their respective ends. FIG. 34A shows an expanded state (state elongated in the left-to-right direction) of the extendable arm structure, while FIG. 34B shows a contracted state (state shortened in the left-to-right direction) of the extendable arm structure.

A feature of this embodiment lies in that the first arm 51 and the second arm 52 have the structure shown in FIG. 4. That is, as shown in FIG. 35A and FIG. 35B, the first arm 51 and the second arm 52 each include the first bend member 1, the second bend member 2, the third bend member 3, and the fourth bend member 4.

The first bend member 1 has the first central coupling point, the first one-end coupling point, and the first other-end coupling point, arranged so as to form a V shape with a fixed bend angle. The second bend member 2 has the second central coupling point, the second one-end coupling point, and the second other-end coupling point, arranged so as to form a V shape with a fixed bend angle, with the second central coupling point being pivotally coupled to the first central coupling point of the first bend member 1.

The third bend member 3 has the third central coupling point, the third one-end coupling point, and the third other-end coupling point, arranged so as to form a V shape with a fixed bend angle, with the third one-end coupling point being pivotally coupled to the first one-end coupling point of the first bend member 1. The fourth bend member 4 has the fourth central coupling point, the fourth one-end coupling point, and the fourth other-end coupling point, arranged so as to form a V shape with a fixed bend angle, with the fourth one-end coupling point being pivotally coupled to the second one-end coupling point of the second bend member 2, the fourth central coupling point being pivotally coupled to the third central coupling point of the third bend member 3.

Figure 35A:
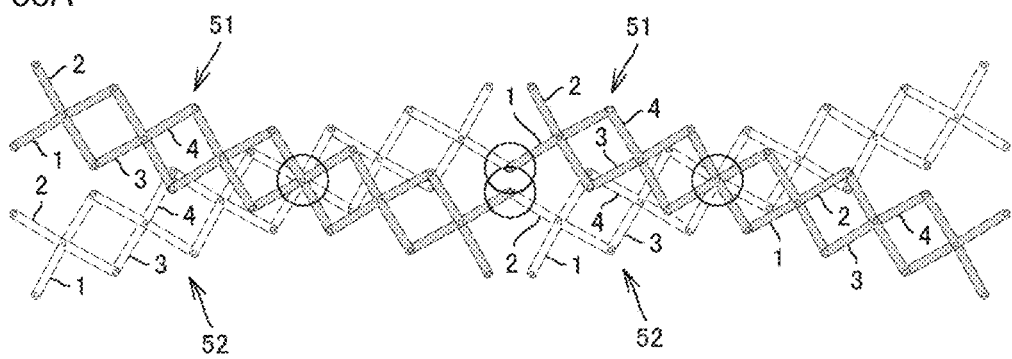
FIG. 35A and FIG. 35B are front views of an embodiment of a extendable arm structure according to an embodiment of the present invention, FIG. 35A showing the state extended in the length direction, FIG. 35B showing the state contracted in the length direction.
Figure 35A:
Figure 35B:
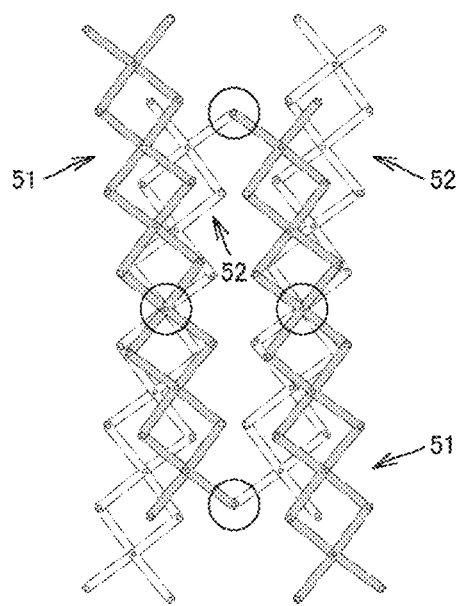

In FIGS. 35A and 35B, circled portions are a coupling portion between the first arm 51 and the second arm 52 and a coupling portion between adjacent cross units.

Figure 36A:
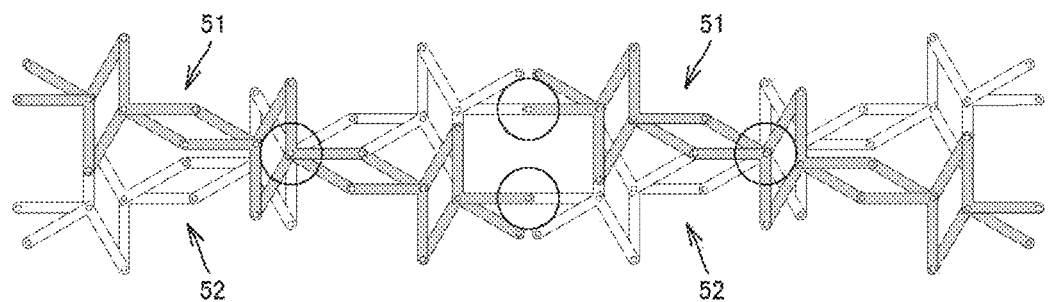
FIG. 36A and FIG. 36B are front views showing a change in shape of the bend extendable arms of the extendable arm structure shown in FIG. 35A and FIG. 35B, with FIG. 36A showing the state extended in the length direction, FIG. 36B showing the state contracted in the length direction.
Figure 36A:
Figure 36B:
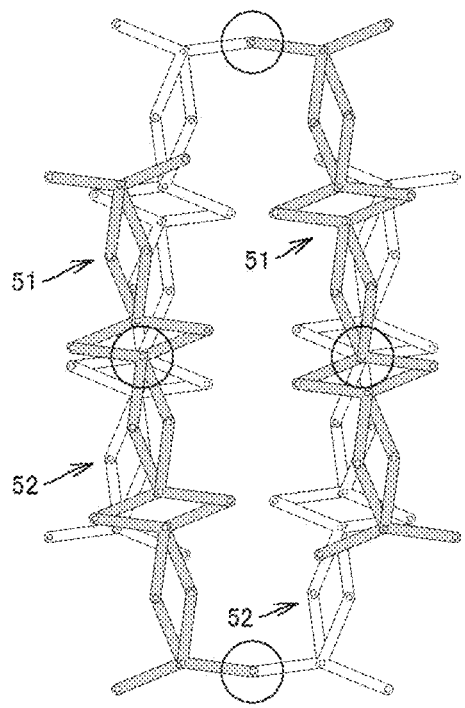

FIG. 36A shows the state of shape of the first arm 51 and the second arm 52 changed from the state of FIG. 35A. FIG. 36B shows the state of shape of the first arm 51 and the second arm 52 changed from the state of FIG. 35B.

The process of change from the state of FIG. 35A to the state of FIG. 36B is to contract and deform the extendable arm structure including the first arm 51 and the second arm 52 in the left-to-right direction and to change the shape of each of the first arm 51 and the second arm 52 themselves.

The shape of FIGS. 36A and 36B changed from the original shape of the extendable arm structure shown in FIG. 35A is beyond the easily predictable range and accordingly greatly stimulates a person's visual interest.

Figure 37A:
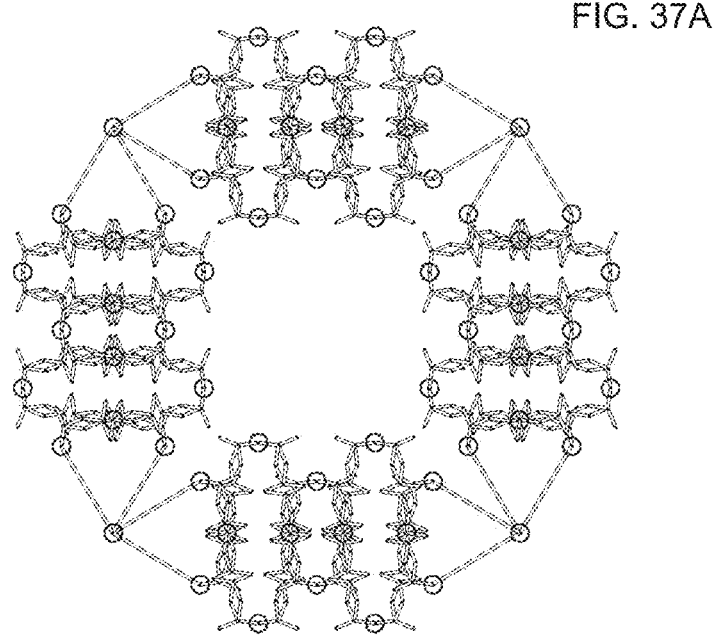
FIG. 37A and FIG. 37B are front views of a variable shape frame using the extendable arm structure shown in FIG. 35A and FIG. 35B, with FIG. 37A showing its original shape, FIG. 37B showing a change in shape after extension of the extendable arms.
Figure 37B:
Figure 37B:
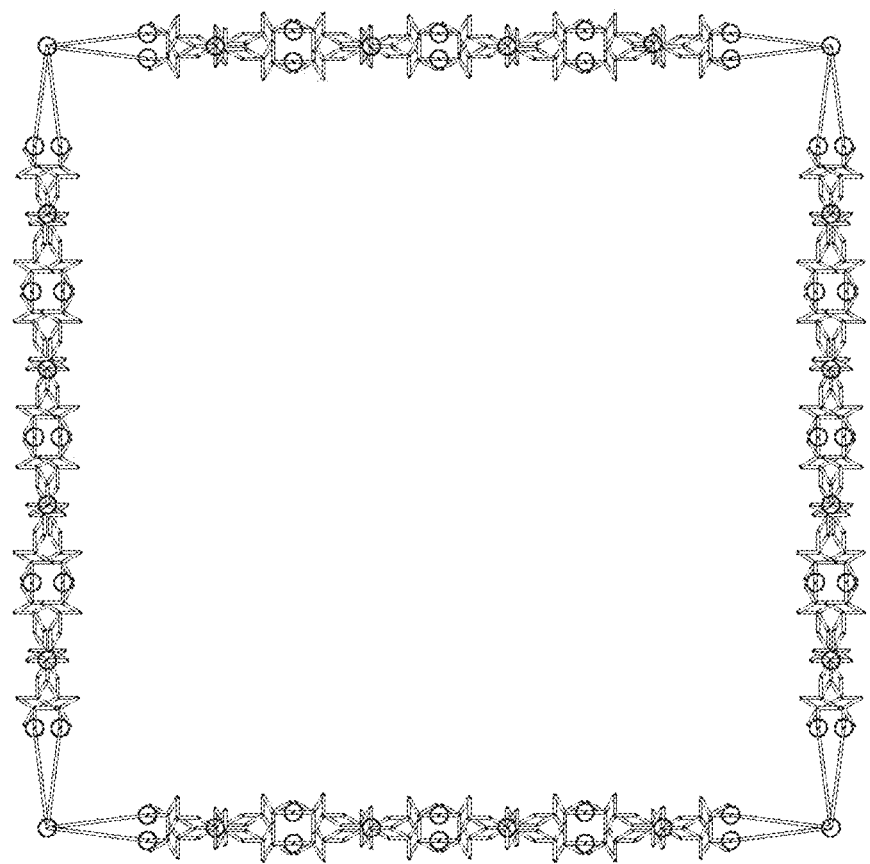

<Embodiment Shown in FIG. 37A and FIG. 37B>

FIG. 37A and FIG. 37B show another example of the variable shape frame. The shown variable shape frame is a combination of the first bend member, the second bend member, the third bend member, the fourth bend member, the first bent member, and the second bent member. The first bent member and the second bent member are located at frame corners to pivotally couple a side on one hand and a side on the other together.

Similarly to the already described embodiments, series structures extending in the X direction are created by the first bend member, the second bend member, the third bend member, and the fourth bend member, and the upper and lower series structures adjacent in Y direction are partially connected together. In FIG. 37A and FIG. 37B, a circled portion is a portion coupling the upper and lower series structures in a bendable manner.

Since the extendable arm structure making up each of the sides of the variable shape frame of FIG. 37A and FIG. 37B has already been described in detail with reference to FIG. 34A to FIG. 36B, duplicate explanations will not be given here.

FIG. 37A shows the shape in a state where the shape of the extendable arm structure itself is deformed as shown in FIG. 36A and FIG. 36B and then the extendable arm structures are contracted as shown in FIG. 36B. FIG. 37B shows the shape in a state where the shape of the extendable arm structure itself is deformed as shown in FIG. 36A and FIG. 36B and then the extendable arm structures are expanded as shown in FIG. 36A. The change from the shape of FIG. 37A to the shape of FIG. 37B is beyond the easily predictable range and accordingly greatly stimulates visual interest.

Figure 38:
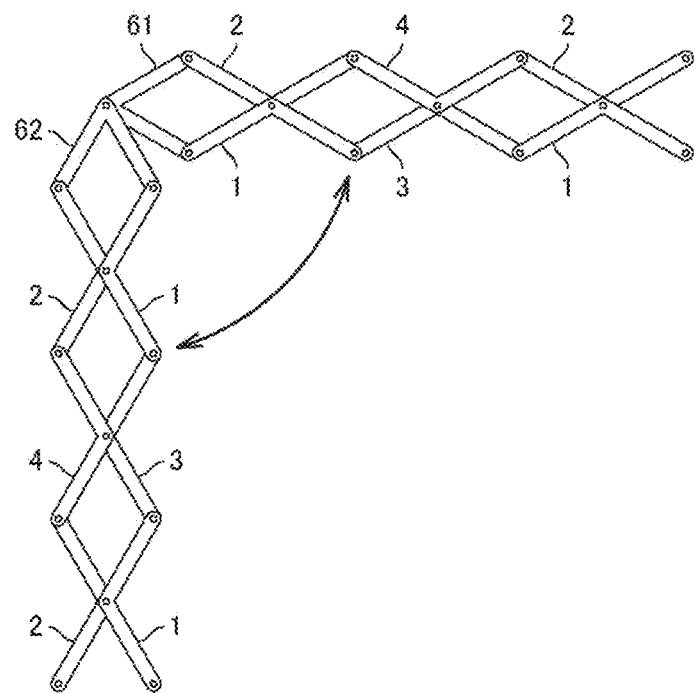
FIG. 38 is a view showing a structure in which an X-direction bend member row and a Y-direction bend member row are coupled together at freely changeable bending angle.

<Embodiment Shown in FIG. 38>

FIG. 38 shows a structure in which an X-direction bend member row including a plurality of bend members coupled and extended in the X direction and a Y-direction bend member row including a plurality of bend members coupled and extended in the Y direction are coupled together at freely changeable bending angle.

In the X-direction bend member row and the Y-direction bend member row in the embodiment of FIG. 38, the first bend member 1 and the second bend member 2 are pivotally coupled together at their central coupling points, while the third bend member 3 and the fourth bend member 4 are pivotally coupled together at their central coupling points. The first bend member 1 and the third bend member 3 are pivotally coupled together at their one-end coupling points. The second bend member 2 and the fourth bend member 4 are pivotally coupled together at their one-end coupling points.

The X-direction bend member row and the Y-direction bend member row are coupled together at freely changeable bending angle via two V-shaped bend corner members 61 and 62. The two V-shaped bend corner members 61 and 62 are pivotally coupled together at their central coupling points. The one-end coupling point of each of the bend corner members 61 and 62 is pivotally coupled to the other-end coupling point of the first bend member 1, while the other-end coupling point of each of the bend corner members 61 and 62 is pivotally coupled to the other-end coupling point of the second bend member 2.

As a variant, in place of each of the V-shaped bend corner members 61 and 62, two rectilinear members may be pivotally coupled at their ends into a V shape. In this case, the crossing angle of the V shape composed of the two rectilinear members can be freely changed.

As another variant, instead of using the V-shaped bend corner members 61 and 62, two first bend members 1 lying adjacent at the corner may be pivotally coupled together at their ends on one hand.

Figure 39:
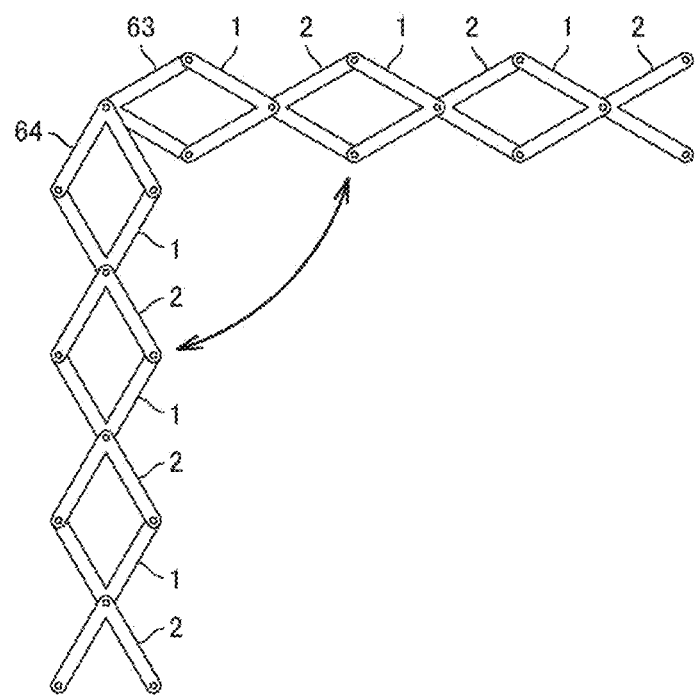
FIG. 39 is a view showing another structure in which the X-direction bend member row and the Y-direction bend member row are coupled together at freely changeable bending angle.

<Embodiment Shown in FIG. 39>

FIG. 39 shows a structure in which similarly to the embodiment shown in FIG. 38, the X-direction bend member row including a plurality of bend members coupled and extended in the X direction and the Y-direction bend member row including a plurality of bend members coupled and extended in the Y direction are coupled together at freely changeable bending angle.

In the X-direction bend member row and the Y-direction bend member row in the embodiment of FIG. 39, a unit including the first bend member 1 and the second bend member 2 is repeatedly arranged. The first bend member 1 and the second bend member 2 making up each unit are pivotally coupled together at their central coupling points. Coupling between two adjacent units is achieved by coupling together the both coupling points of the second bend member 2 of one unit and the both coupling points of the first bend member 1 of the other unit.

The X-direction bend member row and the Y-direction bend member row are coupled together at freely changeable bending angle via two V-shaped bend corner members 63 and 64. The two V-shaped bend corner members 63 and 64 are pivotally coupled together at their central coupling points. Both coupling points of each of the bend corner members 63 and 64 are coupled to both coupling points of the first bend member 1.

As a variant, in place of each of the V-shaped bend corner members 63 and 64, two rectilinear members may be pivotally coupled at their ends into a V shape. In this case, the crossing angle of the V shape composed of the two rectilinear members can be freely changed.

As another variant, instead of using the V-shaped bend corner members 63 and 64, two first bend members 1 lying adjacent at the corner may be pivotally coupled together at their ends on one hand.

A three-dimensional form may be made by combining a plurality of variable shape frames, variable shape panels, and extendable arm structures. In such a three-dimensional form, the change in shape is beyond the predictable range.

Although some embodiments of the present invention have been described with reference to the drawings, the present invention is not limited to the shown embodiments. The shown embodiments can be variously modified or altered within the same scope as that of the present invention or within the scope equivalent thereto.

The variable shape structure according to an embodiment of the present invention has a change in shape beyond the ordinary person's predictable range and therefore can be said to be a visual interest stimulating structure. For that reason, its change in shape can be enjoyed with surprise, greatly stimulating a person's visual interest.

The variable shape structure according to an embodiment of the present invention arousing visual interest can be used as e.g. a partition that divides a space. The variable shape structure may be placed in a visible area, e.g. inside a double-glazed window or in a space that can be seen through the glass surface of the table. The variable shape structure can be used also as part of the interior decoration or as part of the outdoor decoration.

Applicable specific products can be e.g. interior, exterior, object, art, illumination, space design, decorative window, ceiling, wall, mobile case, cabin tent, office space construction, hanger, decorative shelf, furniture, accessory, jewelry, bag, variable shape structure of a nozzle generating laser light, high-frequency waves, etc., variable shape electronic component, and variable shape structure indicating atomic array, electronic array, or molecular array.

The change in shape of the variable shape structure occurs by operating part of the frame or the panel. The appearance of shape changing beyond the predictable range by the partial operation especially stimulates children's interests, rendering it available as educational toys for example.

LIST OF PARTS 1 a first bend member; 1a a first central coupling point; 1b a first one-end coupling point; 1c a first other-end coupling point; 2 a second bend member; 2a a second central coupling point; 2b a second one-end coupling point; 2c a second other-end coupling point; 3 a third bend member; 3a a third central coupling point; 3b a third one-end coupling point; 3c a third other-end coupling point; 4 a fourth bend member; 4a a fourth central coupling point; 4b a fourth one-end coupling point; 4c a fourth other-end coupling point; 5 a coupling member; 11 a first bent member; 12 a second bent member; 13 a corner coupling shaft; 20 a cross unit; 21,22 a linear member; 23 a coupling member; 31 a first bendable and extendable arm; 32 a second bendable and extendable arm; 33 a third bendable and extendable arm; 34 a fourth bendable and extendable arm; 41 a first linear member; 42 a second linear member; 43 a pivot shaft; 51 a first arm; 52 a second arm; 61,62,63,64 a V-shaped bend corner member; 100 a variable shape panel

What is claimed is:

1. A variable shape structure comprising:
a first bend member having a first central coupling point, a first one-end coupling point, and a first other-end coupling point that are arranged so as to form a V shape with a fixed bend angle;
a second bend member having a second central coupling point, a second one-end coupling point, and a second other-end coupling point that are arranged so as to form a V shape with a fixed bend angle, the second central coupling point being pivotally coupled to the first central coupling point of the first bend member;
a third bend member having a third central coupling point, a third one-end coupling point, and a third other-end coupling point that are arranged so as to form a V shape with a fixed bend angle, at least one of the third one-end coupling point and the third other-end coupling point being coupled to one of the first one-end coupling point and the first other-end coupling point of the first bend member, and
a fourth bend member having a fourth central coupling point, a fourth one-end coupling point, and a fourth other-end coupling point that are arranged so as to form a V shape with a fixed bend angle, the fourth bend member being adjacent to the first bend member in a Y direction, at least one of the fourth one-end coupling point and the fourth other-end coupling point being coupled to one of the first one-end coupling point and the first other-end coupling point of the first bend member, wherein
the second bend member is adjacent to the first bend member in the Y direction, and wherein the structure forms a panel by coupling together the first, second, third and fourth bend members that are adjacent in an X direction and the Y direction, and wherein
the third bend member is adjacent to the first bend member in the X direction.

2. The variable shape structure of claim 1, wherein the first, second, third and fourth bend members contiguously coupled in the X direction or the Y direction each have a same shape and a same size, with a length between the central coupling point and the one-end coupling point being equal to a length between the central coupling point and the other-end coupling point.

3. The variable shape structure of claim 1, wherein the first, second, third and fourth bend members contiguously coupled in the X direction and the first, second, third and fourth bend members contiguously coupled in the Y direction each have the same shape and the same size, with a length between the central coupling point and the one-end coupling point being equal to a length between the central coupling point and the other-end coupling point.

4. The variable shape structure of claim 1, wherein the third one-end coupling point of the third bend member is pivotally coupled to the first one-end coupling point of the first bend member, and wherein
the fourth one-end coupling point of the fourth bend member is pivotally coupled to the first one-end coupling point of the first bend member.

5. The variable shape structure of claim 1, further comprising:
a cross unit in which two linear members crossed in an X shape are pivotally coupled together at an intersection, wherein
the cross unit has four end coupling points,
each of the four end coupling points being pivotally coupled to the one-end coupling point of one of the first, second, third and fourth bend members.

6. The variable shape structure of claim 1, comprising:
a plurality of cross units each including a first arm and a second arm that are crossed in an X shape, at an intersection of which both the arms are pivotally coupled, the cross units adjacent to each other being pivotally coupled together at the cross units ends, wherein
each of the first arm and the second arm comprises the first bend member, the second bend member, the third bend member, and the fourth bend member, wherein
the third bend member is pivotally coupled at the third one-end coupling point to the first one-end coupling point of the first bend member, and wherein
the fourth central coupling point is pivotally coupled to the third central coupling point of the third bend member.

7. The variable shape structure of claim 1, wherein the first, second and third bend members adjacent to each other are coupled together to form a frame.

8. The variable shape structure of claim 7, wherein the first bend member, the second bend member, and the third member have the same shape and the same size, and wherein
a length between the central coupling point and the one-end coupling point is equal to a length between the central coupling point and the other-end coupling point.

9. The variable shape structure of claim 8, wherein the fourth central coupling point is pivotally coupled to the third central coupling point of the third bend member, wherein
the third one-end coupling point of the third bend member is pivotally coupled to the first one-end coupling point of the first bend member, wherein
the fourth one-end coupling point of the fourth bend member is pivotally coupled to the second one-end coupling point of the second bend member, and wherein
the fourth bend member has the same shape and the same size as those of the first bend member, the second bend member, and the third bend member.

10. The variable shape structure of claim 7, wherein the fourth central coupling point is pivotally coupled to the third central coupling point of the third bend member, wherein
the third one-end coupling point of the third bend member is pivotally coupled to the first one-end coupling point of the first bend member, and wherein
the fourth one-end coupling point of the fourth bend member is pivotally coupled to the second one-end coupling point of the second bend member.

11. The variable shape structure of claim 7, wherein the third one-end coupling point of the third bend member is coupled to the first one-end coupling point of the first bend member, and wherein
the third other-end coupling point of the third bend member is coupled to the first other-end coupling point of the first bend member.

12. The variable shape structure of claim 7, wherein the variable shape structure is a frame having a plurality of corners, the structure further comprising:

a first bent member with a bent shape pivotally coupled, at each of the corners, to the one-end coupling point of the one of the bend members adjacent to the one-end of the first bent member and to the other-end coupling point of the one of the bend members adjacent on the other-end of the first bent member;

a second bent member with a bent shape pivotally coupled, at each of the corners, to the one-end coupling point of the one of the bend members adjacent to the one-end of the second bent member, to which the first bent member is not coupled, and to the other-end coupling point of the one of the bend members adjacent on the other-end of the second bent member, to which the first bent member is not coupled; and a corner coupling shaft via which the first bent member and the second bent member are pivotally coupled together at their intersection.

13. A variable shape structure comprising:

a first bend member having a first central coupling point, a first one-end coupling point, and a first other-end coupling point that are arranged so as to form a V shape with a fixed bend angle;

a second bend member having a second central coupling point, a second one-end coupling point, and a second other-end coupling point that are arranged so as to form a V shape with a fixed bend angle, the second central coupling point being pivotally coupled to the first central coupling point of the first bend member;

a third bend member having a third central coupling point, a third one-end coupling point, and a third other-end coupling point that are arranged so as to form a V shape with a fixed bend angle, at least one of the third one-end coupling point and the third other-end coupling point being coupled to one of the first one-end coupling point and the first other-end coupling point of the first bend member, wherein the structure forms a panel by coupling together a plurality of extendable arms that are adjacent in an X direction and a Y direction, wherein the second bend member is adjacent to the first bend member in the Y direction, wherein the third bend member is adjacent to the first bend member in the X direction, the third one-end coupling point being pivotally coupled to the first one-end coupling point of the first bend member, the structure further comprising:

a fourth bend member having a fourth central coupling point, a fourth one-end coupling point, and a fourth other-end coupling point that are arranged so as to form a V shape with a fixed bend angle, the fourth bend member being adjacent to the second bend member in the X direction, the fourth one-end coupling point being pivotally coupled to the second one-end coupling point of the second bend member, the fourth central coupling point being pivotally coupled to the third central coupling point of the third bend member, wherein the first, second, third and fourth bend members each comprise linearly contiguous cross units to make up an extendable arm of the plurality of extendable arms, and wherein each of the cross units comprises a first linear member, a second linear member crossing the first linear member, and a pivot shaft via which the first linear member and the second linear member are pivotally coupled together at an intersection.

14. The variable shape structure of claim 13, wherein each of the first, second, third and fourth bend members forms a semicircular arm in its expanded state.

* * * * *